United States Patent
Yang et al.

(10) Patent No.: US 9,541,404 B2
(45) Date of Patent: Jan. 10, 2017

(54) SYSTEM FOR DETERMINING THE LOCATION OF ENTRANCES AND AREAS OF INTEREST

(71) Applicant: Samsung Electronics Co., Ltd., Suwon-si, Gyeonggi-do (KR)

(72) Inventors: Jun Yang, Milpitas, CA (US); Yifei Jiang, Santa Clara, CA (US); Koichi Mori, San Jose, CA (US); Shalinder S. Sidhu, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 14/549,054

(22) Filed: Nov. 20, 2014

(65) Prior Publication Data

US 2016/0061607 A1 Mar. 3, 2016

Related U.S. Application Data

(60) Provisional application No. 62/044,113, filed on Aug. 29, 2014.

(51) Int. Cl.
| | |
|---|---|
| *G01C 21/20* | (2006.01) |
| *G01S 19/13* | (2010.01) |
| *G01C 21/32* | (2006.01) |
| *G01S 5/02* | (2010.01) |

(52) U.S. Cl.
CPC ............ *G01C 21/206* (2013.01); *G01C 21/32* (2013.01); *G01S 5/0263* (2013.01)

(58) Field of Classification Search
CPC ........ G01C 21/206; G01C 21/32; G01S 19/13
See application file for complete search history.

(56) References Cited

U.S. PATENT DOCUMENTS

| | | | |
|---|---|---|---|
| 6,108,597 A | 8/2000 | Kirchner et al. | |
| 7,764,231 B1 * | 7/2010 | Karr .................. | G01S 1/026 342/450 |
| 8,320,939 B1 | 11/2012 | Vincent | |
| 8,472,980 B2 | 6/2013 | Khorashadi et al. | |
| 8,548,738 B1 | 10/2013 | Kadous et al. | |
| 8,583,400 B2 | 11/2013 | Thrun et al. | |
| 8,626,198 B2 | 1/2014 | Das et al. | |
| 8,896,485 B2 | 11/2014 | Mendelson | |
| 8,965,688 B2 | 2/2015 | Bandyopadhyay et al. | |

(Continued)

FOREIGN PATENT DOCUMENTS

| | | |
|---|---|---|
| KR | 10-2006-0131200 | 12/2006 |
| KR | 10-2008-0105160 A | 12/2008 |

(Continued)

OTHER PUBLICATIONS

Le et al., "Indoor Navigation System for Handheld Devices", Worcester Polytechnic Institute, Oct. 22, 2009.

(Continued)

*Primary Examiner* — Tuan C. To
(74) *Attorney, Agent, or Firm* — Beyer Law Group LLP

(57) ABSTRACT

In one aspect, GPS data, ambient signal data, radio frequency data and/or other types of data are used to determine the location of an entrance to an area or a building. In another aspect, sequential trajectory data is collected and the data is analyzed and/or processed to determine the location of an area of interest.

20 Claims, 14 Drawing Sheets

(56) References Cited

U.S. PATENT DOCUMENTS

| | | | |
|---|---|---|---|
| 8,994,591 B2* | 3/2015 | Dupray | G01C 21/206 |
| | | | 342/457 |
| 9,014,970 B2 | 4/2015 | Oi et al. | |
| 9,052,203 B2 | 6/2015 | Kelly | |
| 9,135,569 B2* | 9/2015 | Narasimha | G06N 99/005 |
| 9,231,882 B2* | 1/2016 | Fulton | G06F 9/45558 |
| 9,253,109 B2* | 2/2016 | Koponen | G06F 9/45558 |
| 2009/0138353 A1 | 5/2009 | Mendelson | |
| 2010/0152063 A1* | 6/2010 | Cappuccilli | C07K 14/78 |
| | | | 506/17 |
| 2010/0198814 A1 | 8/2010 | Petersen et al. | |
| 2010/0285817 A1 | 11/2010 | Zhao et al. | |
| 2011/0151898 A1 | 6/2011 | Chandra et al. | |
| 2011/0208822 A1* | 8/2011 | Rathod | G06Q 30/02 |
| | | | 709/206 |
| 2011/0282581 A1* | 11/2011 | Zeng | G01S 17/936 |
| | | | 701/301 |
| 2011/0285591 A1 | 11/2011 | Wong | |
| 2011/0313779 A1 | 12/2011 | Herzog et al. | |
| 2012/0021762 A1 | 1/2012 | Garin et al. | |
| 2012/0029817 A1 | 2/2012 | Khorashadi et al. | |
| 2012/0099774 A1* | 4/2012 | Akcakaya | G06T 11/008 |
| | | | 382/131 |
| 2012/0102164 A1 | 4/2012 | Grun et al. | |
| 2012/0102165 A1 | 4/2012 | Gruen et al. | |
| 2012/0130625 A1 | 5/2012 | Srivastava | |
| 2012/0130762 A1 | 5/2012 | Gale et al. | |
| 2012/0176491 A1 | 7/2012 | Garin et al. | |
| 2012/0182933 A1 | 7/2012 | Bandhakavi et al. | |
| 2012/0184292 A1 | 7/2012 | Lin et al. | |
| 2012/0185458 A1 | 7/2012 | Liu et al. | |
| 2012/0294532 A1 | 11/2012 | Morris | |
| 2012/0303556 A1 | 11/2012 | Lin et al. | |
| 2013/0023282 A1 | 1/2013 | Lin et al. | |
| 2013/0079033 A1 | 3/2013 | Gupta et al. | |
| 2013/0084882 A1 | 4/2013 | Khorashadi et al. | |
| 2013/0084891 A1 | 4/2013 | Khorashadi et al. | |
| 2013/0116968 A1 | 5/2013 | Wirola et al. | |
| 2013/0122935 A1 | 5/2013 | Das et al. | |
| 2013/0151139 A1 | 6/2013 | Park | |
| 2013/0166202 A1 | 6/2013 | Bandyopadhyay et al. | |
| 2013/0195314 A1 | 8/2013 | Wirola et al. | |
| 2013/0201365 A1 | 8/2013 | Wirola et al. | |
| 2013/0204652 A1 | 8/2013 | Ritchie et al. | |
| 2013/0222369 A1 | 8/2013 | Huston et al. | |
| 2013/0267251 A1 | 10/2013 | Khorashadi et al. | |
| 2014/0018095 A1 | 1/2014 | Parvizi et al. | |
| 2014/0066103 A1 | 3/2014 | Das et al. | |
| 2014/0087707 A1 | 3/2014 | Gustafsson et al. | |
| 2014/0119565 A1* | 5/2014 | Kim | G10K 15/02 |
| | | | 381/86 |
| 2014/0129976 A1 | 5/2014 | Beaurepaire et al. | |
| 2014/0171039 A1 | 6/2014 | Bjontegard | |
| 2014/0188537 A1 | 7/2014 | Milbert et al. | |
| 2014/0195147 A1 | 7/2014 | Gluek | |
| 2014/0222332 A1 | 8/2014 | Lee et al. | |
| 2014/0278060 A1 | 9/2014 | Kordari et al. | |
| 2014/0281698 A1 | 9/2014 | Khorashadi et al. | |
| 2014/0335893 A1 | 11/2014 | Ronen | |
| 2015/0204676 A1 | 7/2015 | Zhang et al. | |
| 2015/0308839 A1 | 10/2015 | Jiang et al. | |
| 2015/0309180 A1 | 10/2015 | Jiang et al. | |
| 2015/0325000 A1* | 11/2015 | Sripada | G06K 9/00718 |
| | | | 382/103 |
| 2016/0063097 A1* | 3/2016 | Brown | G06F 17/30713 |
| | | | 707/737 |

FOREIGN PATENT DOCUMENTS

| | | |
|---|---|---|
| KR | 10-1017479 B1 | 2/2011 |
| WO | 2010/003898 | 1/2010 |
| WO | 2013/071885 A1 | 5/2013 |
| WO | 2013/100287 A1 | 7/2013 |

OTHER PUBLICATIONS

Pombinho et al., "Indoor Positioning Using a Mobile Phone with an Integrated Accelerometer and Digital Compass", INForum, 2010.

Shala et al., "Indoor Positioning using Sensor-fusion in Android Devices", Department Computer Science Kristianstad University, Sep. 2011.

Xuan et al., "Crowd Sourcing Indoor Maps with Mobile Sensors", University of California, Berkeley, 2012.

Trein et al., "Simple approach for indoor mapping using low-cost accelerometer and gyroscope sensors", University of Toronto Toronto, Canada, 2013.

Radu et al., "HiMLoc: Indoor Smartphone Localization via Activity Aware Pedestrian Dead Reckoning with Selective Crowdsourced WiFi Fingerprinting", 2013 International Conference on Indoor Positioning and Indoor Navigation, Oct. 2013.

Wang et al., "No Need to War-Drive: Unsupervised Indoor Localization", MobiSys'12, Jun. 25-29, 2012.

Ashbrook et al., "Using GPS to Learn Signi¯cant Locations and Predict Movement Across Multiple Users", Personal and Ubiquitous Computing, 2003.

International Search Report dated Nov. 30, 2015 from PCT Application No. PCT/KR2015/008764.

Durrant-Whyte et al., *Simultaneous Localization and Mapping: Part I.* IEEE Robotics and Automation Magazine, 2006.

Philipp et al., *MapGENIE: Grammar-enhanced Indoor Map Construction from Crowd-Source Data,* ACM MobiCom 2014.

Alzantot et al., *CrowdInside: Automatic Construction of Indoor Floorplans,* ACM SIGSPATIAL 2012.

\* cited by examiner

SYSTEM FOR DETERMINING THE LOCATION OF ENTRANCES AND AREAS OF INTEREST

CROSS-REFERENCE TO RELATED APPLICATION

This application claims priority of U.S. Provisional Patent Application No. 62/044,113 filed Aug. 29, 2014, which is incorporated by reference herein in its entirety for all purposes.

FIELD OF THE INVENTION

The present invention relates generally to a system for determining the location of particular areas of interest, such an entrance to a building, an indoor room, an outdoor site, a store, a shopping area, or any other suitable location. In various embodiments, GPS data, sensor data, radio frequency (RF) data and sequential trajectory data are used to determine the location of the areas of interest.

BACKGROUND

There are a wide variety of mapping and positioning technologies. By way of example, many modern smartphones and mobile devices use the Global Positioning System (GPS). In a typical implementation, the smartphone receives signals from multiple GPS satellites. The GPS signals help indicate the distance between the smartphone and the satellites. The smartphone then uses the GPS data to determine its location, which is typically represented as a geocoordinate or GPS coordinate (e.g., a pair of latitude and longitude coordinates.) The GPS system is used in a wide variety of mapping applications and can be used to pinpoint the location of almost any outdoor landmark, region or building.

One disadvantage of the GPS system, however, is that it is ineffective or substantially less effective in indoor environments, because the walls and ceilings of a building may block the satellite signals. Thus, there are ongoing efforts to develop systems that can identify the location of indoor rooms, structures and other areas where a GPS signal cannot be received.

SUMMARY

In one aspect, a method for determining the location of an entrance to a building, structure, enclosed space or other area is described. Various types of data, such as GPS data, ambient signal data, radio frequency data and/or sensor data, is collected. Based on the data, the location of the entrance is determined.

In another aspect, a method for determining the location of an area of interest (e.g., an indoor room, a landmark, a store, etc.) will be described. In some embodiments, the area of interest is an indoor room or other structure in the aforementioned building, although in other embodiments, the area of interest is an outdoor structure or site. Sequential trajectory data (e.g., PDR data, GPS data, etc.) is obtained that forms multiple clusters. The clusters are filtered based on speed and motion e.g., the speed and motion of a mobile device user. A location of the area of interest is determined based at least in part on the remaining unfiltered cluster(s). In various implementations, this determination is performed by a mobile device. The mobile device then transmits this candidate area of interest to a server for further analysis.

In another aspect, multiple candidate areas of interest are received from multiple devices. In some embodiments, a mobile device transmits this data to a server. A subset of the candidate areas of interest is selected based on a trajectory distance measurement. Based on the subset, the location of the area of interest is determined. In some approaches, the candidate areas of interest are represented by clusters of traces. Weights are assigned to each cluster based on trace/cluster density and the weights are used to help determine the location of the area of interest. After the location of an area of interest is determined based on the crowdsourced data, it can be transmitted to a device for use in a wide variety of mapping, navigation and localization applications.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention relates to a positioning system. More specifically, various embodiments involve a system for accurately detecting the location of areas of interest, such as the entrance to a site, building, structure, room or landmark.

As noted in the Background, Global Positioning System (GPS) technology is often used to map and navigate outdoor environments but is less effective in indoor environments. One technology that is sometimes used for navigating indoor environments is referred to as pedestrian dead reckoning (PDR).

A typical application of PDR can be described as follows. A user has a device (e.g., a mobile phone or smartphone) with various sensors, such as a compass or accelerometer. The sensors can detect the direction that the user is moving in, as well as approximate the distance that the user has moved. With this information, the PDR engine on the device can estimate a new location for the user. As the user continues to move over time, the PDR engine estimates a new location for the user while using the prior estimated location as a reference point.

While useful in various applications, one disadvantage of a PDR-based navigation system is that it is heavily dependent on the accuracy of each location estimation. If the PDR engine erroneously determines the location of a user at a particular time, this error is carried on to later location estimations and can grow exponentially over time. Since the data obtained from the device sensors is often imperfect, such errors are common in PDR-based navigation systems.

In various embodiments of the present invention, systems are described that can more accurately determine the location of particular areas of interest (e.g., a room, an entrance to a park or a building, a landmark, etc.). A PDR-based navigation system can then use these areas as reference points for error correction. The devices, methods and techniques described herein can also be used for a wide variety of other navigation, localization and mapping applications.

Figure 1:
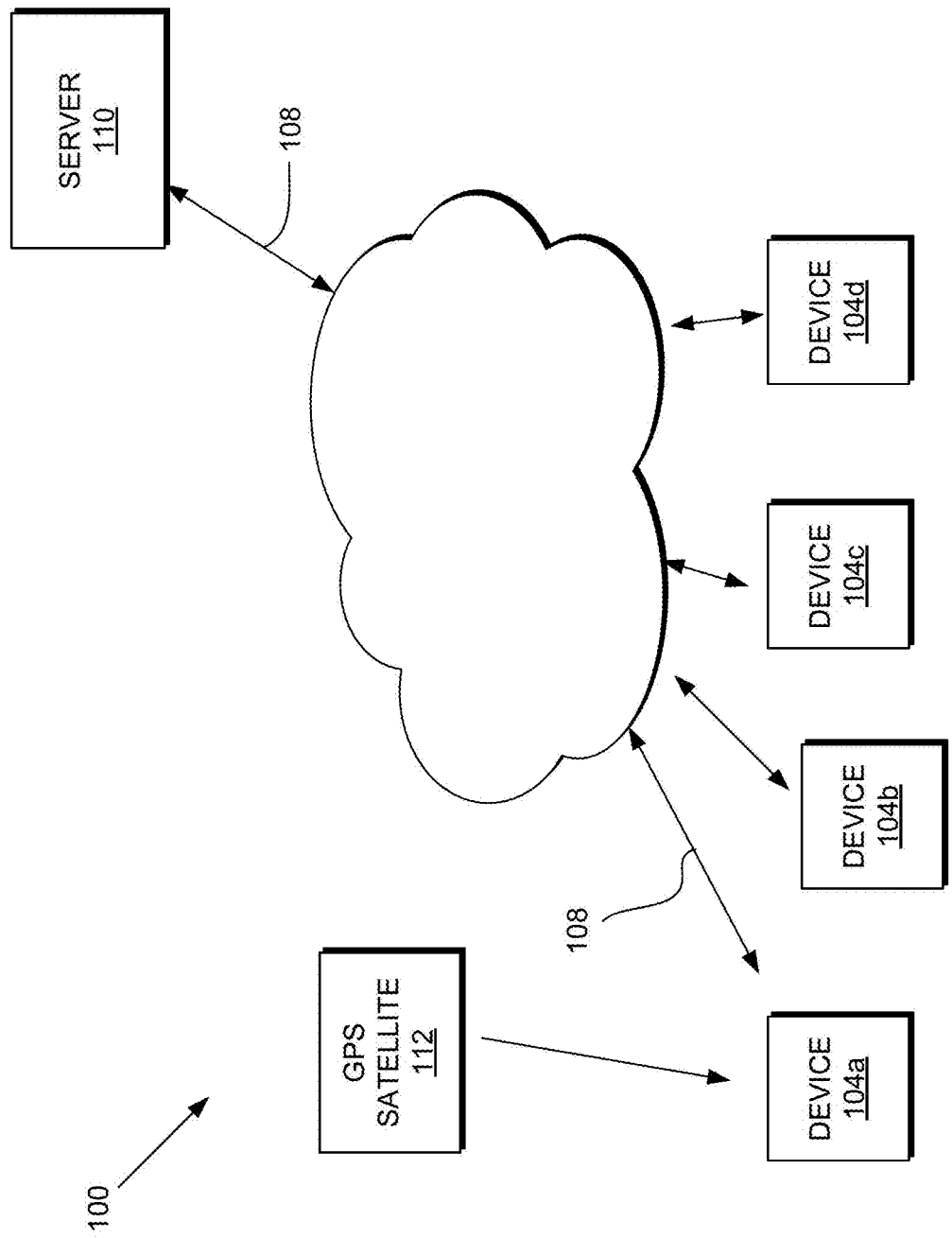
FIG. 1 is a block diagram of a communications system according to a particular embodiment of the present invention.

Referring initially to FIG. 1, a communications system 100 according to a particular embodiment of the present invention will be described. The system includes multiple devices 104a-104d and a server 110. The devices 104a-104d and the server 110 communicate with one another using one or more networks 108. The devices 104a-104d are also configured to receive GPS signals from the GPS satellite 112.

Any suitable network 108 may be used to connect the devices and the server. In various embodiments, the network involves but is not limited to a cellular network based on CDMA or GSM, the Internet or any other suitable protocol or any other communication network.

In various embodiments, a user carries a device 104a while moving from place to place. The device 104a may be any suitable computing device, including but not limited to a smartphone, smart glasses, a smartwatch, a laptop, a computer tablet or any other portable computing system. The device 104a includes a network interface that allows it to receive GPS signals, radio frequency (RF) signals (e.g., WiFi, Bluetooth, etc.) as well as any other suitable ambient signal. The device 104a also includes sensors that can detect, for example, magnetic fields, temperature, images, light, sound, direction, acceleration, movement or any other suitable environmental parameter.

Some implementations of the present invention involve using the device 104a to determine the location of particular areas of interest. In various embodiments, for example, the location of an entrance to an indoor or partially indoor structure can be determined. The device 104a is arranged to use a combination of GPS signals, radio frequency (RF), sensor data and/or various types of ambient signals to estimate a location of the entrance. As will be described in greater detail later in the application, the use of multiple types of signals can allow the device 104a to determine the location of the entrance with greater accuracy.

Once the user reaches the entrance to the building, the user can move around within the building. The device 104a will then use its sensors to collect sequential trajectory data that helps trace the movement of the user. This application describes various methods and clustering techniques used to analyze the data and determine the location of particular areas of interest, such as indoor rooms, the entrances/exits to rooms and any other suitable landmark. It should be noted that many of the methods described in this application can also be used to determine the location of areas of interest in outdoor environments as well, such as amusement parks, outdoor malls, parks, outdoor shopping areas, etc.

Some implementations of the present invention use crowdsourcing techniques to further improve the accuracy of the above techniques. In various embodiments, for example, candidate indoor locations or areas of interest can be transmitted from multiple devices (e.g., devices 104a-104d) to the server 110. The server 110 can then further analyze, filter and/or cluster the data as appropriate to determine a location of a particular landmark, room or other area.

The above examples and the methods described in this application refer to various techniques used to determine the location of a building, an indoor room, or an entrance to a building or room. Some of the techniques described herein are particularly useful for such applications, since the techniques can be used to trace the movements of a user and identify room locations even in buildings where GPS signals cannot be received. However, it should be appreciated that the described techniques are not limited to determining the location of buildings, indoor rooms or entrances to the same. Rather, the techniques can also be used to determine the location of a wide variety of areas, including outdoor or partially outdoor areas (e.g., an entrance to an outdoor shopping area, an outdoor landmark, an entrance to a store in the outdoor shopping area, etc.)

Figure 2:
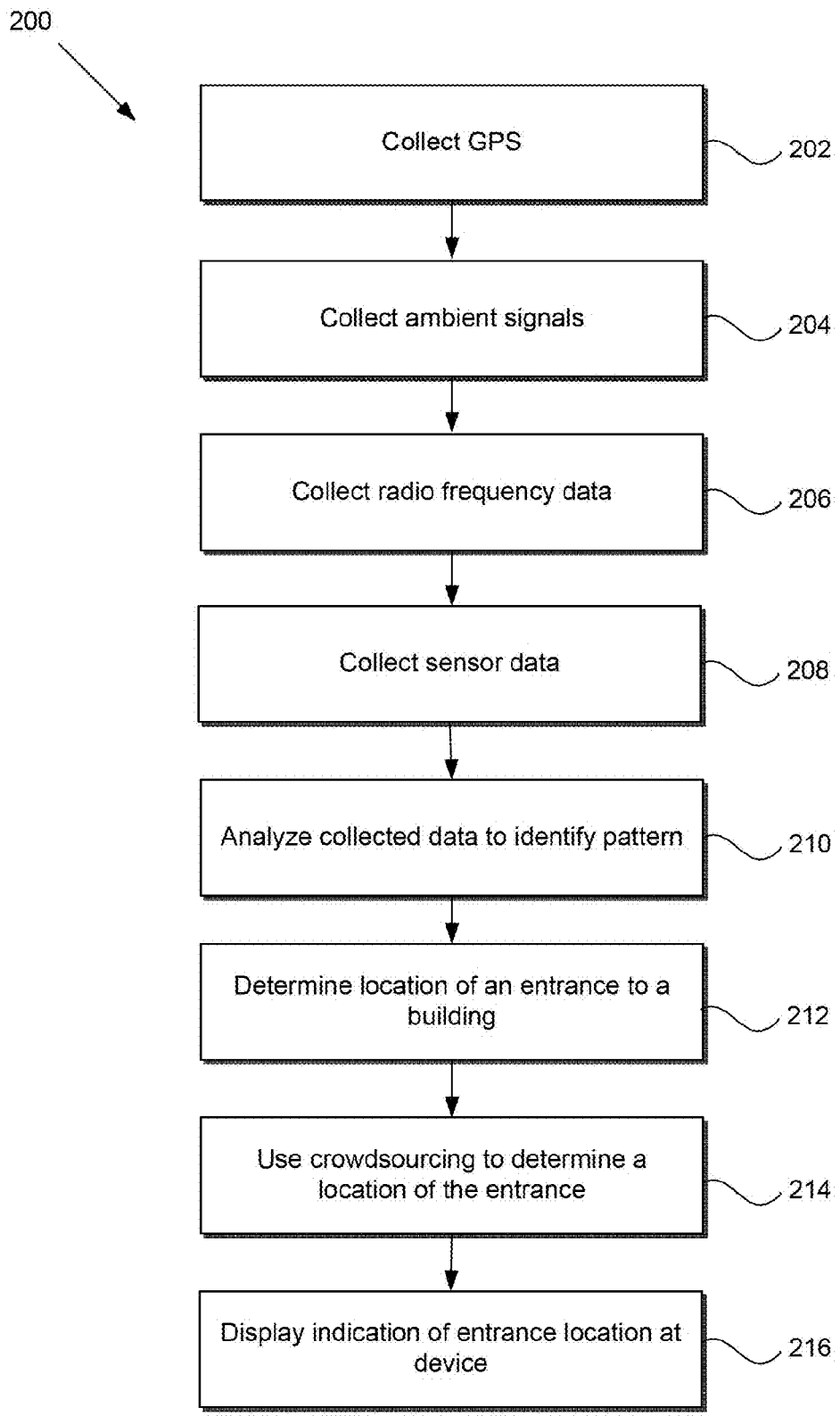
FIG. 2 is a flow diagram illustrating a method for determining the location of an entrance according to a particular embodiment of the present invention.

Referring next to FIG. 2, a method 200 for determining an entrance to a region will be described. In this example, the steps are performed by a device 104a that is approaching an entrance of a building, although it should be appreciated that the steps of FIG. 2 can also be implemented by a server 110 and/or can be used to determine the location of an entrance to a wide variety of sites and locations.

Initially, various types of signals are collected by the device 104a. At step 202, the device 104a obtains GPS data. Generally, the GPS data is obtained from multiple GPS satellites while the device 104a is outdoors and has line-of-sight access to the satellites. The device 104a uses the GPS data to periodically determine a GPS coordinate (e.g., a pair of latitude and longitude coordinates) that indicates the current position of the device 104a.

Figure 5:
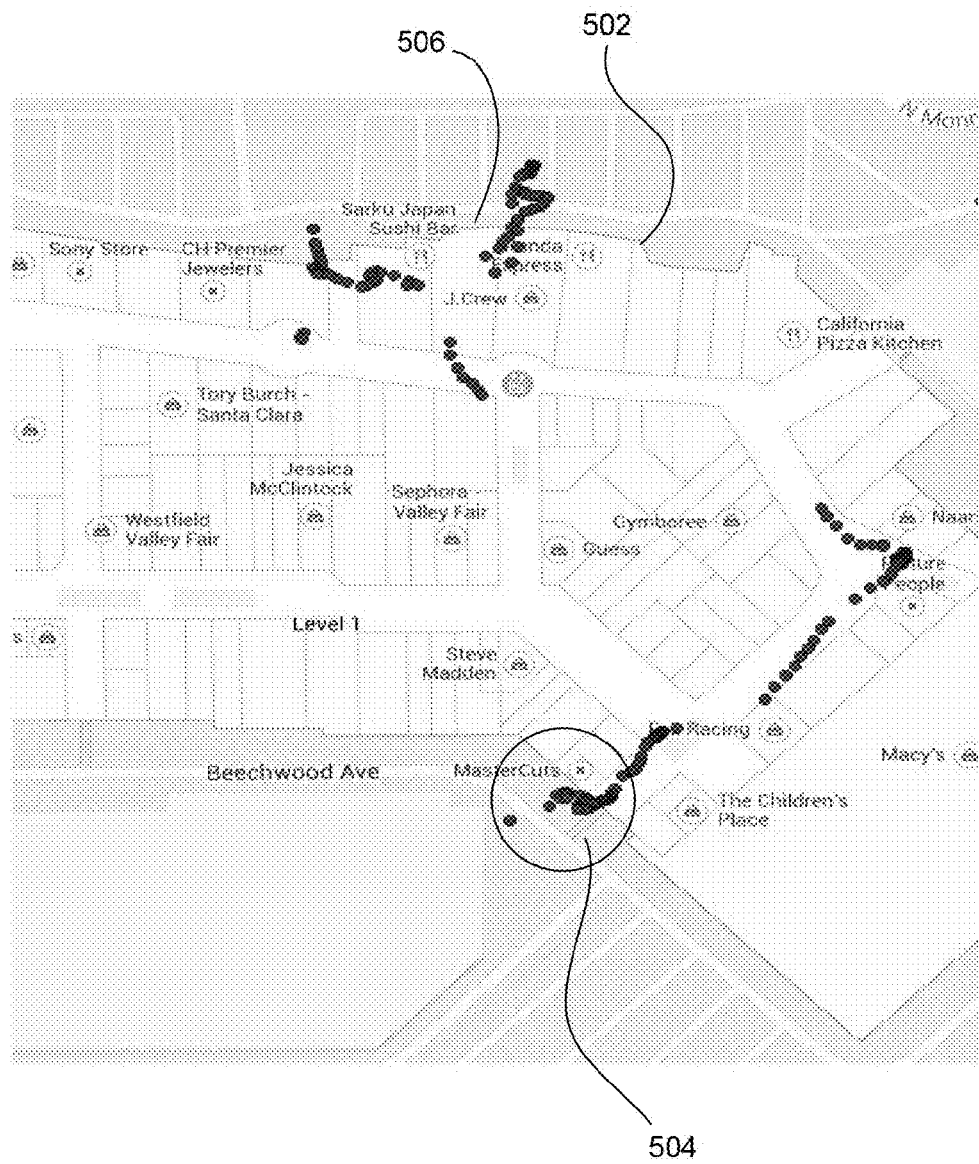
FIG. 5 is an example map indicating where GPS signals were obtained at a mall.

An example of a device 104a collecting GPS signals is illustrated in FIG. 5. FIG. 5 illustrates a building 502 with an entrance 504 and an exit 506. A path of dots indicates the movement of the device 104a. Each dot in the trace represents the successful obtaining of a GPS signal and the determination of a GPS coordinate. As indicated in the figure, the GPS signals are readily obtainable outside of the building, but become difficult to receive in the interior of the building.

Returning to method of FIG. 2, at step 204, the device 104a collects ambient signals. An ambient signal is any time of signal or environmental parameter that can be detected by the device 104a. By way of example, the device 104a can collect any suitable type of radio frequency (RF) data (step 206), such as WiFi or Bluetooth signals. Generally, if RF data is collected, the RF data indicates the strength of signals received at the device 104*a* from one or more access points or transmitting devices. For example, in the case of WiFi, the device 104*a* may collect received signal strength (RSS) data from multiple WiFi access points in the building 502.

The device 104*a* also can collect sensor data that indicates changes in light, sound, temperature, images, magnetic fields or any other characteristic of the environment surrounding the device (step 208). That is, the device 104*a* can include sensors such as a magnetometer, a visual sensor, a camera, a temperature sensor, an audio sensor, and a light sensor. This data is also collected over time as appropriate.

The device 104*a* periodically analyzes the collected ambient signal and GPS data to identify a particular pattern which can help indicate the entrance to a building 502. This process may be performed in a wide variety of ways. In some embodiments, for example, a pattern of changes in the RF data and GPS data is identified and used to help determine the location of the entrance to the building 502.

Generally, when the device 104*a* is outdoors, it is capable of receiving GPS signals and can accurately determine corresponding GPS coordinate that indicate its current position. However, as the device 104*a* moves indoors, the GPS signals may weaken and can be blocked. At the same time, as the device 104*a* approaches a building and goes inside a building, radio frequency signals received from transmitters/access points in the building should get stronger. In various implementations, the device 104*a* examines the RF and GPS data to identify a pattern indicating a weakening in the accuracy of the received GPS signals and an increase in the quality of the RF signals received from access points/RF transmitting devices in the building. In various embodiments, an increase in the quality of the RF signals means that the strength of the received signals is increasing and/or that signals are being received from a greater number of RF access points/transmitters in the building. It is assumed that when that pattern arises, the device 104*a* is moving towards and/or is near the location of the entrance to the building.

Figure 6A:
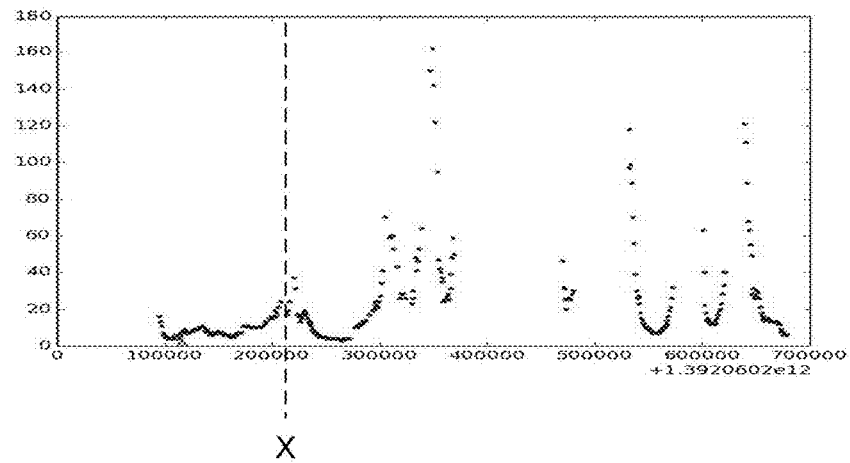
FIGS. 6A and 6B are example graphs indicating changes in GPS signal accuracy and WiFi signal quality over time.
Figure 6B:
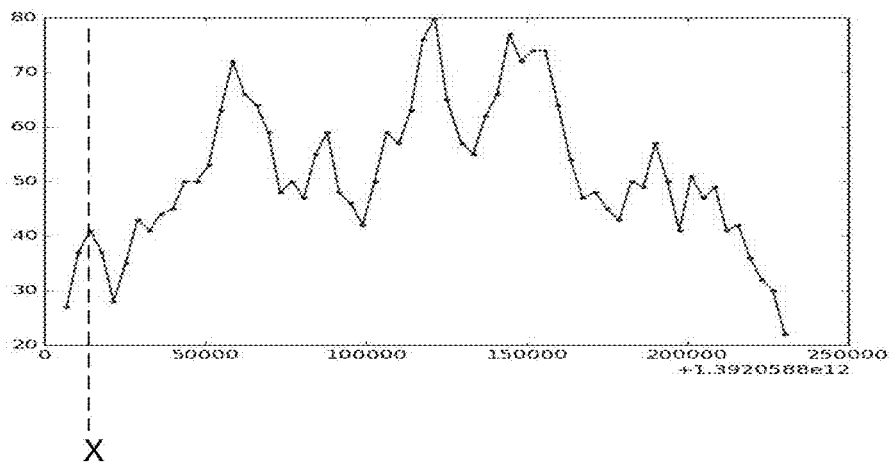

FIGS. 6A and 6B illustrate aspects of the above pattern. FIG. 6A illustrates an example graph of GPS signal accuracy. The graph represents the fluctuating accuracy of GPS signals as they are received at a device 104*a* that is approaching and moving through the building 502. Any suitable metric for measuring GPS signal accuracy can be used. For example, modern smartphones running the iOS and Android operating systems typically associate an indicator of GPS signal accuracy/quality with any obtained GPS coordinate. In the graph of FIG. 6A, the vertical axis represents GPS signal accuracy (a higher value indicates less accuracy), and the horizontal axis represents time in milliseconds. The graph indicates that, over time, the accuracy of the GPS signal can change. For example, the accuracy of GPS signals may increase while the device and its user are outside or near windows or doors, and may decline as the device moves deeper indoors.

FIG. 6B illustrates another graph indicating changes in the number of WiFi access points accessible to the device 104*a* as the device 104*a* approaches and moves through the building 502. The vertical axis of the graph represents the number of access points from which the device 104*a* receives a signal, while the horizontal axis, as in FIG. 6A, represents time in milliseconds. Generally, as the device 104*a* approaches and moves into the building, the number of access points from which it can receive a WiFi signal increases.

In some embodiments, the location of an entrance to the building is determined (step 212) based on the parameters illustrated in FIGS. 6A and 6B. That is, the WiFi data is analyzed to identify a pattern indicating an increase in the number of WiFi access points from which signals can be received at the device 104*a*. Also, a pattern is identified in the GPS data indicating that GPS accuracy has declined after being consistently high for a period of time. If these two patterns occur around a particular time, then it can be assumed that the location of the entrance to the building is wherever the device 104*a* is located at the same time. (In the examples shown in FIGS. 6A and 6B, this occurs approximately at time X, which is designated by a vertical line.)

The determination of the location of the entrance to the building (step 212) can be based on sensor data as well. When a device 104*a* enters a building on a sunny day, the amount of light detected by the device 104*a* will typically decrease, as the device moves indoors. When the device 104*a* enters a building, there may be change in sound, as sounds from the outdoors are muffled by the walls of the building and the sounds within the building are heard better. Also, when a device 104*a* enters a building, the device 104*a* may detect a change in magnetic fields, since the device 104*a* is coming closer to electrical equipment and other magnetic sources in the building. When the device 104*a* enters a building, the device 104*a* may detect a change in the images detected by a camera or a visual sensor. When the device 104*a* enters a building, the device 104*a* may detect a change in temperature. The assumption is that when any of the changes are detected by the device 104*a*, the device 104*a* may be at or near the entrance to the building. In various embodiments, the detection of any combination of the above changes (i.e., changes in light, sound, magnetic properties, GPS accuracy, changes in the number of RF access points from which signals are received at the device 104*a*, changes in RF data or signal strength, etc.) may be used to help determine the location of the entrance to the building.

Figure 7:
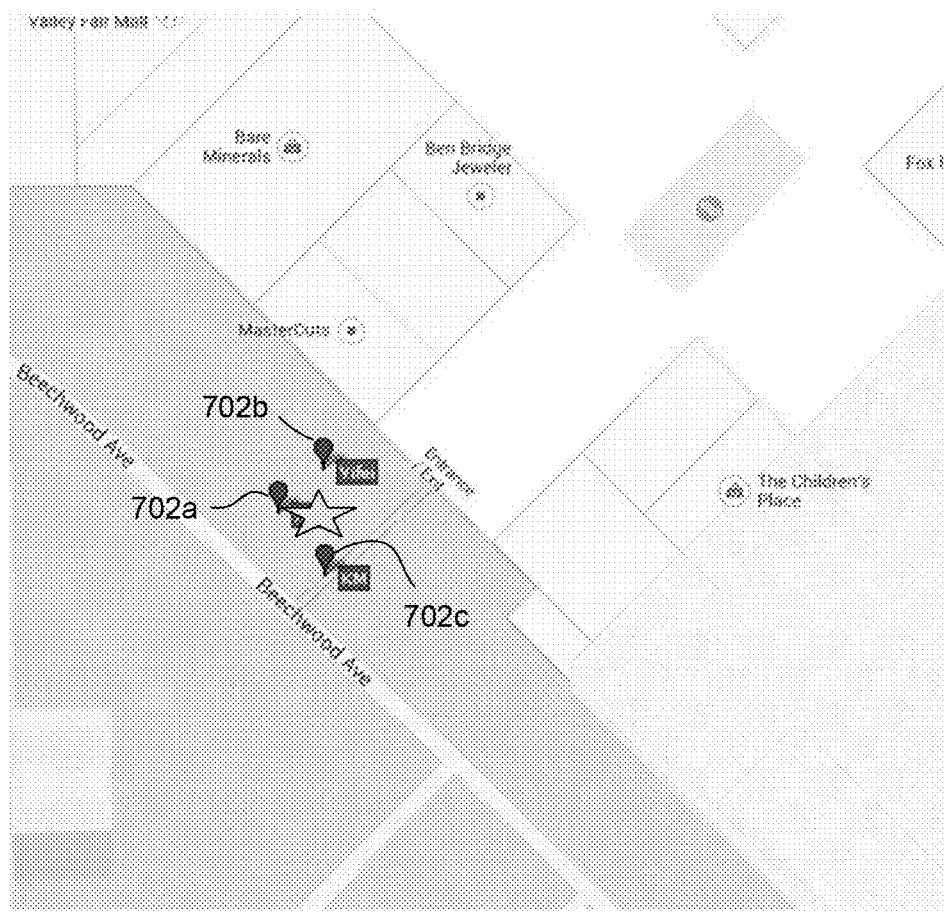
FIG. 7 is an example map indicating estimated locations of a building entrance.

Optionally, at step 214, multiple devices 104*a*-104*d* transmit estimated locations for the building entrance to a server 110. That is, each of many devices performs steps 202, 204, 206, 208, 210 and/or 212 of FIG. 2. Each device then transmits the location of the entrance determined in step 212 to the server 110. The server 110 then utilizes this crowd-sourced information to more accurately determine the location of the entrance (step 214). An example of this is illustrated in FIG. 7. FIG. 7 illustrates a simplified example of three candidate entrance locations 702*a*-702*c*, as determined by three different mobile devices at different times. The server 110 receives these three candidate locations 702*a*-702*c* and can use any suitable algorithm or clustering technique to determine an entrance location based on the received data. In this simplified example, the server 110 forms a cluster based on the three locations and then determines a centroid for the cluster. The centroid, which is designated by the star symbol in FIG. 7, is determined to be the actual location of the entrance to the building.

Returning to FIG. 2, at step 216, the server 110 transmits data indicating the entrance location determined in step 214 to the device 104*a*. The device 104*a* may use the data for a wide variety of navigation, mapping or localization applications. In some embodiments, for example, the device 104*a* displays in a user interface directions on how to get to the entrance location. In still other embodiments, the device displays a map and provides an indicator on the map showing the entrance location. In some embodiments, the device 104*a* displays the above information based on the location estimated by the device 104a in step 212, the location estimated by the server 110 in step 214, or both.

Although the above method was described as being largely performed by the device 104a, it should be noted that a server 110 can also perform some or all of the operations of the method. For example, the device 104a can collect GPS data, RF data, sensor data, and/or ambient signal data, and then transmit this to the server 110. The server 110 obtains this data (steps 202, 204, 206 and 208), analyzes it (step 210) and determines a location of an entrance to the building (steps 212 and 214), as described in the method.

Figure 3:
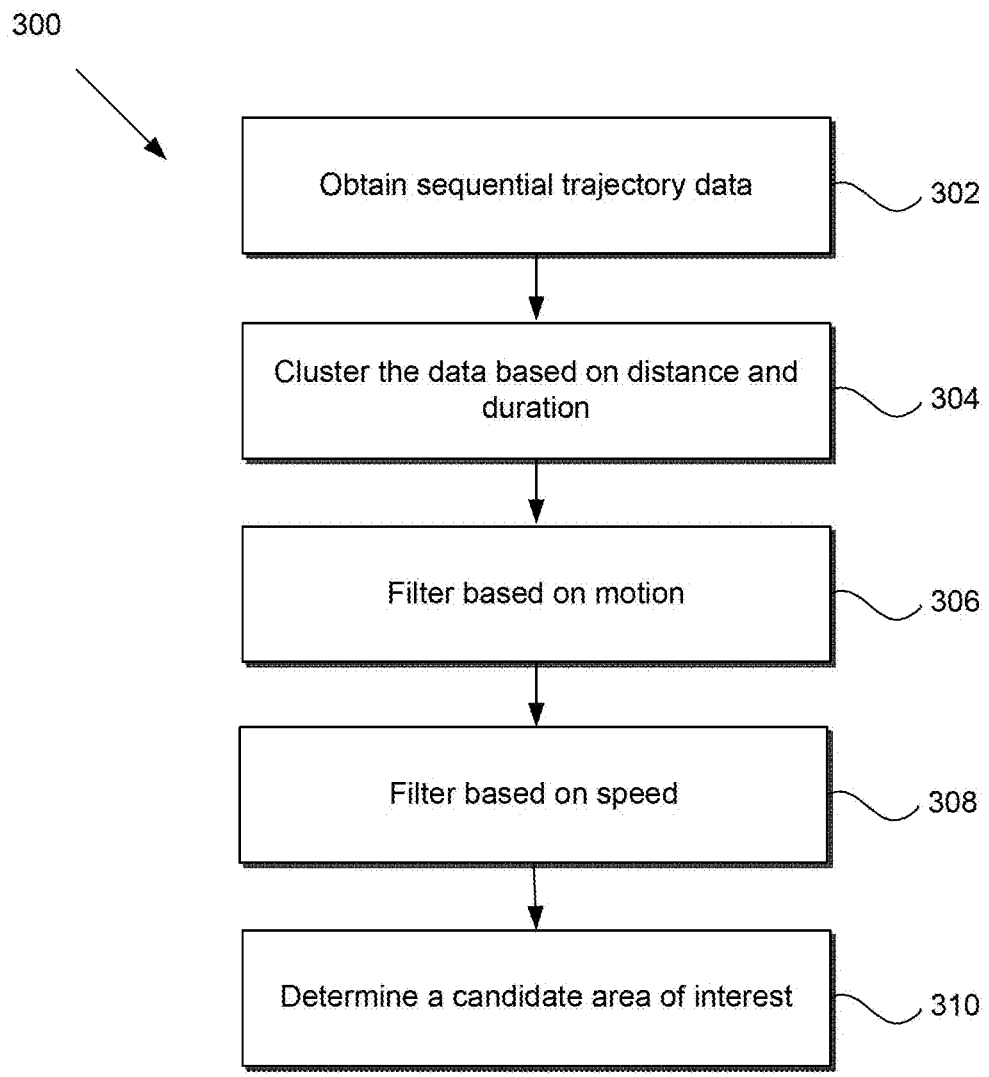
FIG. 3 is a flow diagram illustrating a method for clustering and filtering sequential trajectory data according to a particular embodiment of the present invention.

Referring next to FIG. 3, a method 300 for identifying an area of interest within a larger area or region will be described. The method 300 can be performed by the device 104a or the server 110. In some embodiments, for example, the method 300 is used to identify a room, a landmark, a store or some other area of interest within a larger site (e.g., a building 502, a mall, a park or a shopping district.) Generally, the area of interest is assumed to be a place that people would wish to spend time in, rather than quickly move through. In the illustrated embodiment, the method 300 is used to determine the location of an indoor room within the building described in connection with FIG. 1 or 5. However, it should be appreciated that the method can also be used to determine the location of areas of interest other than indoor rooms and can be used in outdoor environments as well, such as parks, outdoor shopping areas or stadiums.

Initially, sequential trajectory data is obtained (step 302). Sequential trajectory data is any data that helps indicate changes in the position or movement of a device 104a over time. A wide variety of technologies can be used to generate sequential trajectory data. By way of example, for outdoor applications, GPS data can be used to provide such information. For indoor applications, pedestrian dead reckoning (PDR) can be used to generate the sequential trajectory data. Various implementations of PDR involve using the compass, accelerometer and/or other sensor of a device 104a to determine how far and in what direction the device 104a has moved from a particular reference point. A new position is then estimated and is used as a reference point for the next movement. In some embodiments, the sequential trajectory data indicates a plurality of points, which make up a trace. Each point is associated with a timestamp and a position (e.g., an x-y coordinate pair.) Each point in a trace indicates the successive changes in position of a device 104a and the device user.

Figure 8:
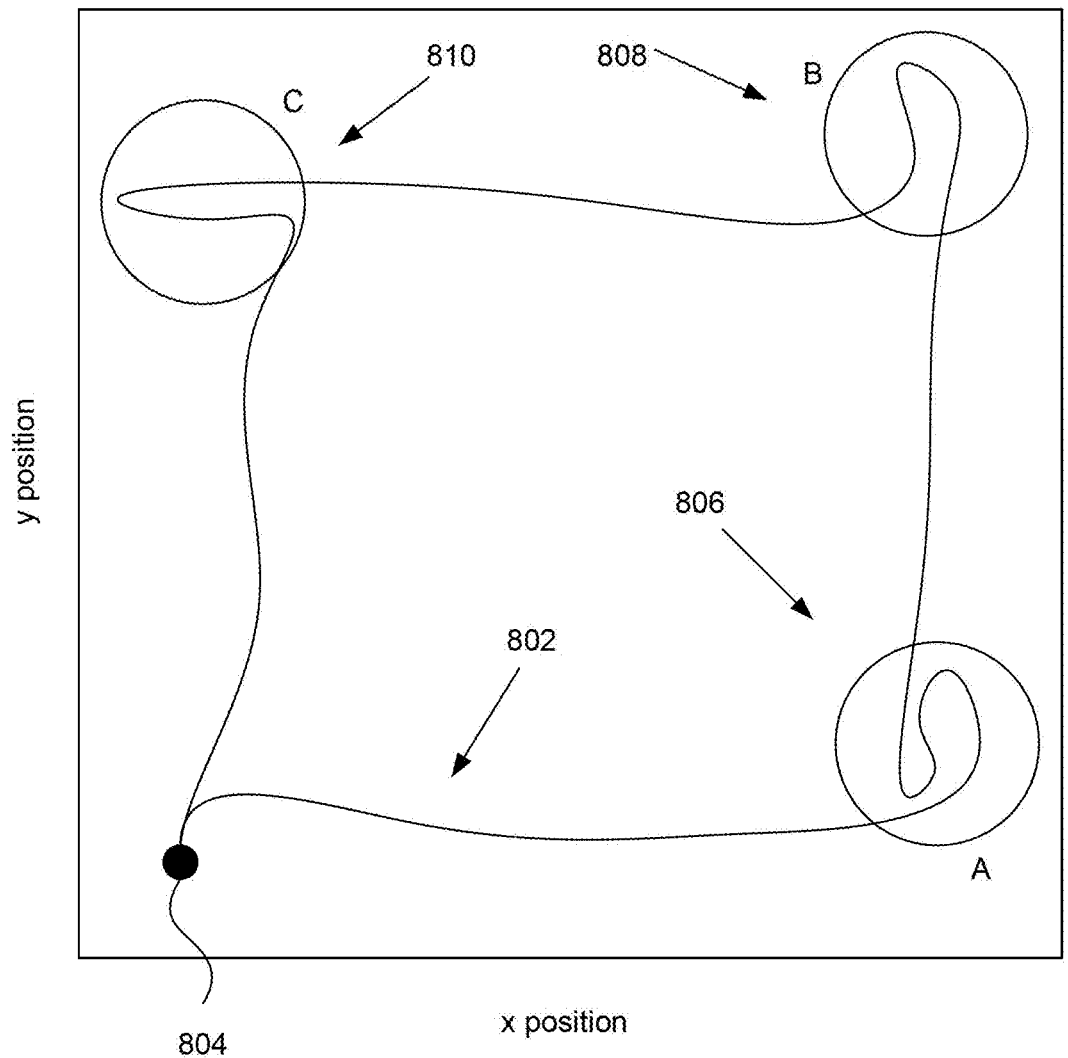
FIG. 8 is an example trace indicating the movement of a device through a building according to a particular embodiment of the present invention.

A simplified example of sequential trajectory data is illustrated in FIG. 8. FIG. 8 illustrates changes in the position of a device 104a as the device 104a and the device user enter and move through a building. In this example, the trace 802 indicates that the device 104a moves from an entrance 804 of the building (which could be the entrance whose location was estimated in step 212 or 214 of FIG. 2), follows a circuitous route in two locations 806/808, moves down a passage and then back again in another location 810, and then returns to the entrance 804. Although the trace 802 is drawn with a solid line, it should be assumed that, in various implementations, the trace 802 is made up of many of the aforementioned points, in which each point represents a time, and a position of the device at that time (e.g., an x-y coordinate.)

Returning to FIG. 3, at step 304, the sequential trajectory data is clustered based on distance and duration. More specifically, clustering techniques are used to identify parts of the trace that represents areas of interest i.e., areas, such as rooms, landmarks, lobbies, stores, where a person would like to spend substantial amounts of time and that might be of particular interest. In various implementations, one or more clusters are formed around some but not all of the points in the trace. Each cluster indicates that the movement of the device was limited to a specified area or radius for a specified period of time. Some other portions of the trace are not clustered when those portions indicate that the device moved beyond the specified area/radius during the specified period of time.

Some of the above concepts are illustrated in FIG. 8. In FIG. 8, the trace 802 indicates that at two locations 806/808, the device 105a moved in a somewhat circular manner and spent substantial amounts of time within a limited space. (Although it is not clearly shown in the figure, it can be assumed that at those locations, multiple points of the trace 802 are superimposed over one another, thus indicating that the device 104a was stationary for a sustained period of time.) Thus, the points that make up these portions of the trace are formed into clusters A and B. There is a third location 810 where the device seems to have retraced its steps and spent substantial amounts of time. Thus, the points in this location form another cluster C.

When a cluster is formed, it may be associated with a particular set of values. In some embodiments, a centroid is calculated for each cluster. Additionally, each cluster is associated with a start position (e.g., the point with the earliest timestamp that is part of the cluster) and an end position (e.g., the point with the latest timestamp that is part of the cluster.) This data can be used to determine the location of entrances or exits to the area of interest, as will be described in greater detail later in the application.

Any suitable clustering algorithm can be used to identify and form clusters from the points in the trace. One example algorithm is provided below:
1) Assume that sequential trajectory data is in the form of multiple points [(xi, yi, i=1, 2 . . . . N).
2) Step 0: Load the above data into an array. Initialize the cluster radius R and the cluster stay duration D.
3) Step 1: Use the first two points left in the array to form a cluster C. Calculate the centroid of cluster C.
4) Step 2: If the next point is within the radius R of the centroid, add this point to the cluster C. Update the centroid and repeat Step 2 with the next point. If the next point is not within the radius R of the centroid, then break this loop and go to Step 3.
5) Step 3: Check the time difference between the time associated with this point and the time associated with the starting point of cluster C. If the time difference is greater than D, set up cluster C as a new cluster with values indicating a start position, an end position and a centroid. In some implementations, if the new cluster is within a specified distance of another cluster, merge those clusters. Then go to Step 1. If the aforementioned time difference is not greater than D, then remove cluster C as a false alarm and go to Step 1.

Of course, it should be appreciated that the above algorithm is provided only for illustrative purposes, and that any suitable clustering algorithm may be used to identify clusters that indicate an area of interest or an area where a device user spent disproportionately large amounts of time.

Returning to FIG. 3, once the clusters have been formed, one or more of the clusters (e.g., clusters A, B, C in FIG. 8) are filtered based on speed or motion (steps 306 and 308). In some embodiments, for example, each point in each of the clusters is associated also with accelerometer data. The accelerometer data, which was obtained using the motion sensor or accelerometer on the device 104a, indicates the amount of motion that the device 104a was undergoing during the time period associated with the cluster. If a particular cluster involves a degree of motion or acceleration that exceeds a specified threshold, then the cluster is filtered out (step 306). The idea behind such filtering is that each cluster is intended to represent an area of interest where the device user spent substantial amounts of time. If the device user instead moved rapidly throughout the cluster, it may be assumed that the cluster does not represent such an area of interest.

The filtering process can also involve analyzing a speed distribution. In various embodiments, the points in the cluster form a trace. Thus, the length of the trace represents the trajectory distance or distance that was traveled during the time period associated with the cluster. The starting and ending points indicates times when the trace began and ended. With this information, an average speed of the cluster can be calculated. In some embodiments, if the average speed associated with the cluster exceeds a predetermined level, the cluster is filtered out, since this indicates that the device user was moving rapidly through the cluster and/or that there was nothing of interest in the cluster to the device.

FIG. 8 illustrates an example of how the above filtering techniques can be applied. At first glance, cluster C appears to indicate that the device 104a spent a sustained period of time in a limited area. However, once the points in cluster C are analyzed, the associated accelerometer data indicates that throughout cluster C, the device was in constant motion without any stopping or delay and that this motion exceeds a predetermined level. Additionally, an analysis of the timestamps and the position data of the points in cluster C indicates that the device 104a moved at a constant speed that exceeded that of a slow walk. This would match a situation in which the device user walked down a passageway, realized that he or she had made a wrong turn, and quickly walked back. Based on the motion and speed data, cluster C is thus filtered out since it apparently does not indicate an area of great interest to the device user.

Returning to FIG. 3, the clustering and filtering processes result in one or more remaining, unfiltered clusters. Each of these clusters represent candidate areas of interest e.g., indoor rooms, notable locations, stores, etc. (step 310). In various embodiments, these clusters can optionally be transmitted to a server 110 for further analysis, as will be described in greater detail below.

It should be noted that the above operations of method 300 can be performed by a device 104a or a server 110. In the case of a device 104a, the device 104a can obtain the sequential trajectory data (step 302) using its sensors, GPS antenna, or any other navigation-related tool. The device 104a can also cluster the data based on distance and duration (step 304) and then filter the resulting clusters based on motion or speed (step 308). Alternatively, in some embodiments, the device 104a collects the sequential trajectory data and transmits it to the server 110. The server 110 receives the data (step 302) and then performs the clustering and filtering operations (steps 306, 308 and 310) described above.

It should be further noted that in various embodiments, the above techniques can be applied not only to indoor environments, but to outdoor environments as well. Consider an example involving an outdoor fair or amusement park, with various outdoor shops and event areas. Multiple users, who are carrying mobile devices 104a, wander about the fairgrounds. The mobile devices obtain sequential trajectory data (e.g., step 302 of FIG. 3), which may be based on GPS tracking, PDR, or any other suitable location tracking mechanism. The sequential trajectory data indicates the movement patterns of the users. In various embodiments, the mobile devices transmit this data to a server, where it is clustered based on distance and duration (e.g., step 304 of FIG. 3). In other embodiments, the clustering takes place at the mobile device. The data is further filtered based on motion and speed (e.g., steps 306 and 308 of FIG. 3.) The clustering and filtering of the data reveals outdoor locations in the fairgrounds where users may have spent substantial amounts of time e.g., event areas, rides, outdoor stores, exhibitions, etc. At least some of these locations are determined to be candidate areas of interest (e.g., step 310 of FIG. 3.)

Figure 4:
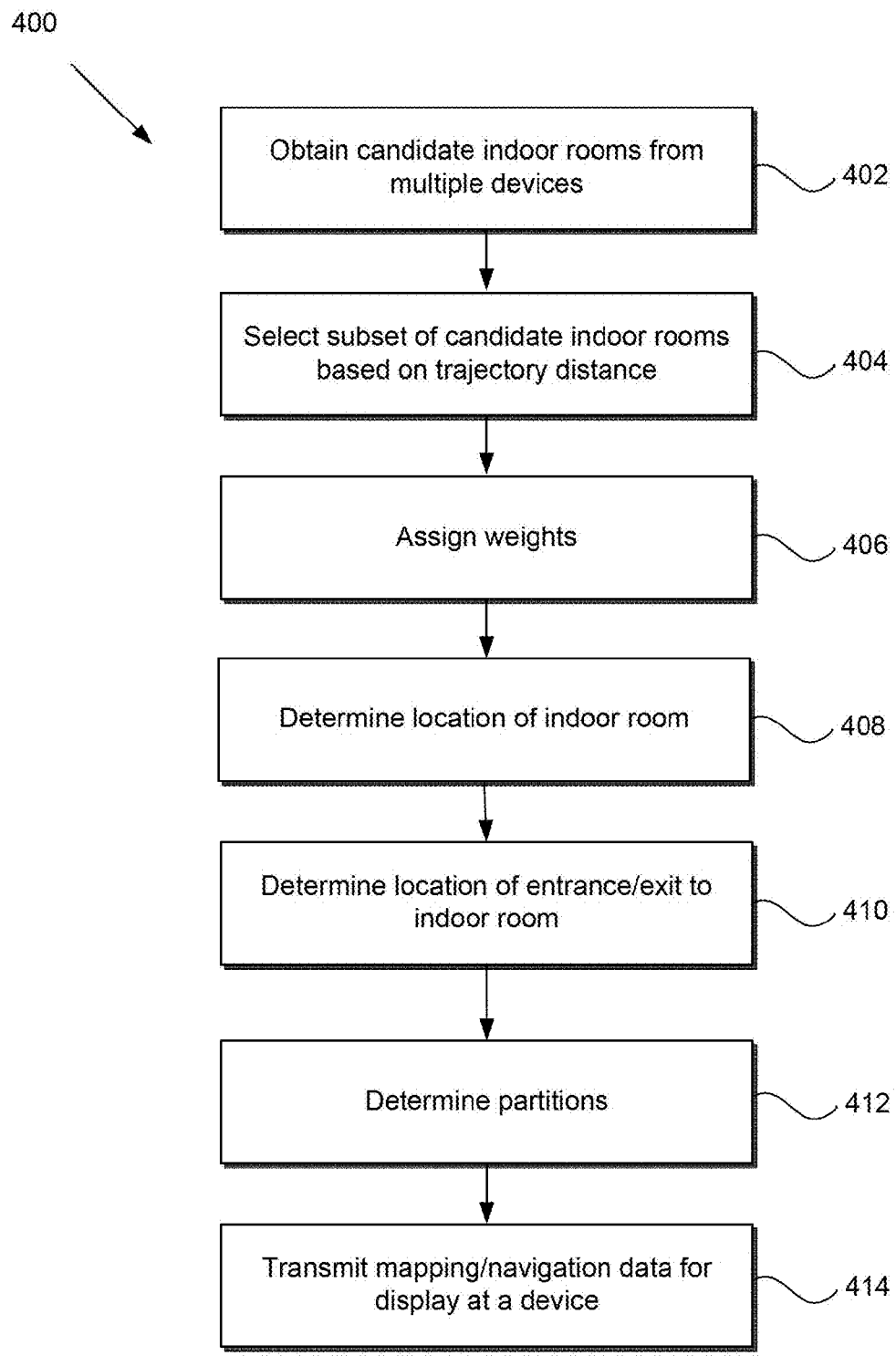
FIG. 4 is a flow diagram illustrating a method for using crowdsourced data to determine a location of an area of interest according to a particular embodiment of the present invention.

Referring next to FIG. 4, a method for determining a location of an area of interest using crowdsourced data will be described. This method may be performed after, for example, multiple devices 104a-104d perform the steps of method 300 of FIG. 3. That is, after performing method 300, each device transmits the clusters obtained in step 310 to the server 110. Each cluster represents a candidate area of interest i.e., the estimated location of an area of interest (e.g., an indoor room). Each candidate area of interest may not be perfectly accurate, due to minor errors in the sensor or signal data that was used to determine it. Generally, the devices 104a-104d also transmit the trace (e.g., trace 802 of FIG. 8) or sequential trajectory data to server 110 for analysis as well. The server 110 then performs the steps of this method 400 on the crowdsourced data to more accurately determine the location of one or more areas of interest (e.g., rooms in a building, stores in an outdoor mall, etc.)

Initially, at step 402, as discussed above, multiple candidate areas of interest are received at the server from multiple devices. In this particular example, the multiple candidate areas of interest are represented by clusters (e.g., the clusters described in step 310 of FIG. 3) and pertain to indoor rooms in a building (e.g., the building referenced in connection with FIG. 2.) However, it should be appreciated that in other implementations, the candidate areas of interest can pertain to any suitable location, landmark, structure, indoor or outdoor site.

Figure 9:
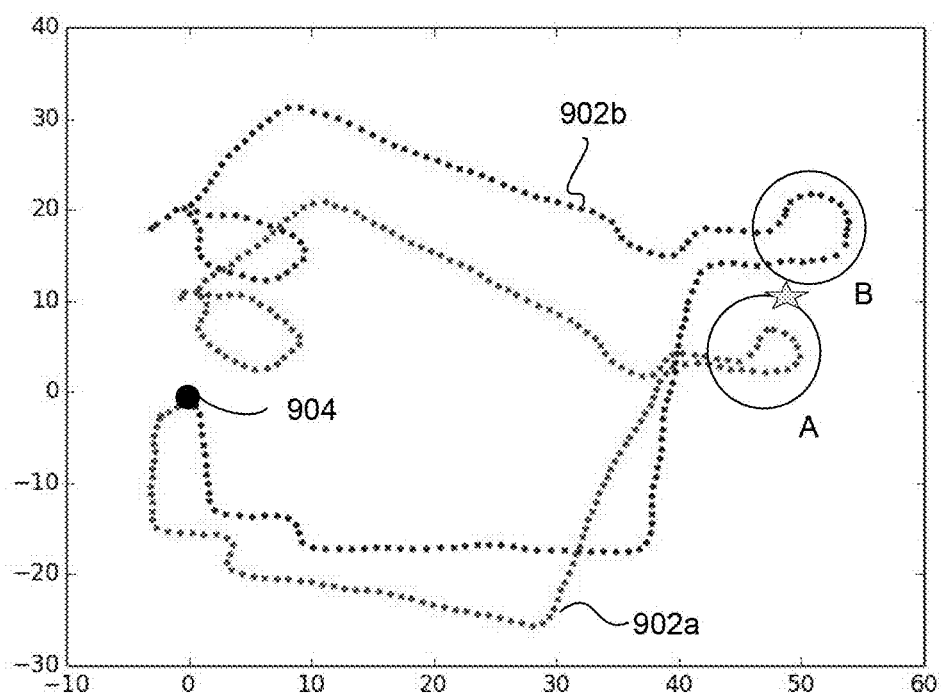
FIGS. 9 and 10 are example traces indicating the movement of multiple devices through an area according to another embodiment of the present invention.

A simplified example of the crowdsourced data obtained in step 402 is illustrated in FIG. 9. FIG. 9 indicates two traces 902a-902b received at server 110 from two separate devices. Trace 902a includes a cluster A and trace 902b includes a cluster B. In this example, clusters A and B were the result of the performance of steps 302, 304, 306, 308 and 310 of FIG. 3 and each represent a candidate area of interest. The traces 902a/902b come from the same general site or location (e.g., the building 502 of FIG. 5 or the building described in connection with FIG. 2) and each start at an entrance point 904. (In this example, it assumed that the entrance point 904 is the entrance determined in step 212 or 214 of FIG. 2, although the entrance or start point may be determined using a wide variety of other techniques as well.) The traces 902a-902b seem to follow a generally similar path, although they are offset from one another. This can often be the case when, for example, the sequential trajectory data was collected using a technique that is prone to small amounts error. For example, as previously discussed, using PDR to generate the trace and sequential trajectory data can generate substantial errors and cause the traces generated by different devices to depart substantially from one another.

Returning to FIG. 4, the server 110 then selects a subset of the multiple candidate indoor rooms based on the trajectory distance (step 404). The trajectory distance is the distance along a trace (e.g., trace 902a) from the starting/ entrance point 904 to a particular corresponding cluster (e.g., cluster A of FIG. 9). The trajectory distance between the entrance point 902 and each cluster (e.g., clusters A and B in FIG. 9) is thus determined. If the trajectory distance is the same or similar (e.g., within a specified band) for one or more clusters, those clusters are used for the rest of the operations of the method 400. Clusters whose corresponding trajectory distances are outliers and/or dissimilar (e.g., outside of the specified band) to the trajectory distances of all other clusters are discarded or not used for the rest of the operations of the method.

An example implementation of step 404 above can be described using the diagram in FIG. 9. In FIG. 9, the trajectory distances are measured from the entrance point 904 to each cluster A and B along the corresponding traces 902a and 902b, respectively. These trajectory distances are then compared. In this example, the trajectory distances for clusters A and B are approximately the same or very similar (e.g., the distances for clusters A and B are both within a band around the same value, such as +/−5%). Since the trajectory distances are similar, it is assumed that clusters A and B likely refer to the same indoor location. Thus, clusters A and B are selected for further analysis (step 404). Any other clusters with dissimilar trajectory distances (outside of the band) are discarded or not used for this particular analysis.

In the above examples, the trajectory distance was measured from the entrance point 904. However, it should be appreciated that the trajectory distance can also be measured or calculated from any suitable reference point, landmark or location.

Referring back to FIG. 4, weights are then optionally assigned to each of the selected clusters. Generally, the weights indicate different assessments of the relevancies of the clusters to a final determination of the indoor location. In some embodiments, for example, different weights are assigned to different clusters based on cluster density. That is, clusters that are in high density areas (i.e., in close proximity to other clusters and/or traces) are given more weight than a cluster that is isolated and faraway from all other clusters.

Figure 10:
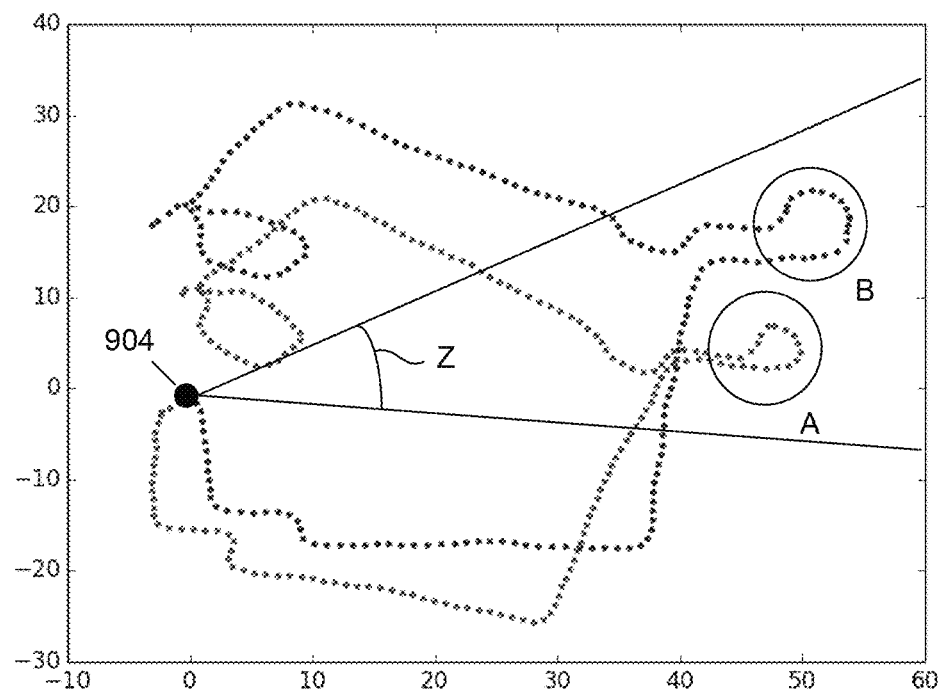

Any suitable algorithm or technique may be used to assign cluster weights based on trace density. In various embodiments, for example, weights are proportional to the angle distribution of the traces starting from a particular point (e.g., the entrance point 904.) One example approach is illustrated in FIG. 10, which is a modified version of FIG. 9. In FIG. 10, clusters A and B are in close proximity to one another and fit within an angular range Z relative to the entrance point 904. Since the density of points, traces and/or clusters in angular range Z is high, greater weight is given to the clusters in that angular range. If there were even more traces and clusters in angular range Z, the weight would be still higher. If there was another angular range with only one isolated cluster and/or very few points/traces in it, that cluster would be given less weight, based on the assumption that such a cluster is more likely to be an erroneous outlier.

Various implementation of the above approach can be represented by the following equation:

$$S = \sum_{k=1}^{K} w_k \cdot S_k(\text{start, end, centroid})$$

In the above formula, S is the cluster representing a final estimation of the location of an indoor room, $S_k$ are the crowdsourced clusters (e.g., cluster A and B in FIG. 9) or clusters that represent candidate indoor room locations, and $w_k$ represents an assigned weight that is proportional to the angular distribution of the traces (e.g., the traces 902a/902b in FIG. 9). The terms start, end and centroid indicate that each cluster is associated with a start point, an end point, and a centroid as previously described. It should be noted that the above formula is intended to be exemplary and that any suitable weighting algorithm or technique may be used.

At step 408, the location of the indoor room is determined. In various embodiments, this determination is based on the subset of clusters selected in step 404 and/or the weights assigned in step 406. Various implementations involving forming a new cluster to determine the final location of the indoor room. In the embodiment illustrated in FIG. 9, for example, clusters A and B are merged to form a new cluster. The centroid of the cluster is calculated and is represented in FIG. 9 by a star symbol. In this particular example, the centroid represents a final estimation of the location of the indoor room.

Optionally, at step 410, the cluster(s) can be analyzed further to determine additional characteristics of the indoor room(s), such as the location and number of entrances. In various embodiments, for example, if a cluster is assumed to be an indoor room, then the server may determine that the location of the start point of the cluster (i.e., the point in the cluster that is associated with the earliest time) marks the location of the entrance to the indoor room. The end point of the cluster (i.e., the point in the cluster that is associated with the latest time) marks the location of another entrance to the indoor room. In some cases, the start and end points will be at the same or approximately the same location, which the server 110 can infer to mean that the device user used a single entrance to enter and exit the indoor room and/or that the indoor room has only one entrance. Any other suitable technique or algorithm may also be used to determine the location and number of entrances to the room.

In some embodiments, the server 110 associates one or more indoor rooms with various characteristics or descriptive information. By way of example, a server 110 may store a blueprint or layout of a mall with multiple rooms, each of which corresponds to a particular store. The server 110 then performs the steps of method 400 and identifies various indoor rooms, as discussed in step 410. By comparing the known layout of the mall with the estimated locations of indoor rooms, the server 110 can then associate particular indoor room locations with particular stores, brands, products, purposes, descriptions and other characteristics.

Additionally, the server 110 can analyze the crowdsourced clusters and traces to determine structural features of the indoor room and/or the surrounding area. For example, if multiple crowdsourced traces indicate that a device 104a and its user can move between two adjacent areas only through a single entrance or point, then it can be assumed that other portions of the boundary between the two areas are solid walls, partitions or some other kind of obstruction. That is, the server 110 can determine that there is a partition, wall or obstruction in a region between two areas or indoor rooms when there is an absence of sequential trajectory data or traces in the region. In this manner, walls, partitions and other structures can be inferred based on an analysis of the collected sequential trajectory data, clusters and determined indoor room locations (step 412).

Returning to FIG. 4, in various embodiments, the server 110 repeats steps 402, 404, 406 and 408 multiple times to determine the location of one or more indoor rooms. At step 414, the server then transmits data indicating the location of the indoor room(s) to a device 104*a*. The server 110 may also transmit any other useful navigation data, such as sequential trajectory data and/or any of the information described above in connection with steps 410 and 412 (e.g., partitions, room/store characteristics, etc.) The device 104*a* may use this data in a wide variety of navigation, mapping and localization applications. In some embodiments, for example, the device 104*a* provides a map and indicates on the map where the indoor room(s) are. In still other embodiments, the device 104*a* provides directions or guidance on how to get to a particular indoor room from the current location of the device. In various implementations, the device 104*a* displays an alert, indicating when the device user has arrived at one of the indoor rooms. Various implementations involve the device 104*a* displaying information indicating the location of each indoor room/structure, and characteristics of the room/structure (e.g., bathroom, name of store, products sold at the store, etc.)

Some implementations involve using the techniques described in FIGS. 2-4 to provide real time traffic or routing data to a user. One such implementation may be described as follows. Initially, one or more of the aforementioned techniques is used to determine the locations of indoor rooms or structures (e.g., as described in FIGS. 2-4, step 310 of FIG. 3 and/or steps 408, 410 and/or 412 of FIG. 4). As a result, a general layout of a particular area and subareas (e.g., a mall with multiple stores) is determined.

Additionally, the location of multiple users is determined using crowdsourced data collected from the mobile devices of those users. Such data can include sequential trajectory data (e.g., as discussed in step 402 of FIG. 4), GPS data, RF data and/or any suitable ambient signal data (e.g., as discussed in steps 202, 204, 206 and 208 of FIG. 2 and step 302 of FIG. 3.) In various embodiments, the mobile devices periodically sends such data to a server 110, which allows the server 110 to track the movements of the users in real time. Thus, the server 110 is able to determine where the users are in the aforementioned layout. By way of example, the server 110 can determine, in real time, how many users are in each store or hallway of the aforementioned mall.

In some embodiments, the server 110 provides a service to the device(s) 104*a* of one or more users based on the above location information. For example, the server 110 can send data to a device 104*a*, indicating how crowded various parts of the mall are and/or which stores have attracted more customers. Some implementations involve the server 110 transmitting routing information or directions to a device 104*a* that help a user get to a desired location from their current location and that takes into account traffic or crowding in the mall. For example, the server 110 can transmit advice to a user's device 104*a*, indicating that the user should enter from a certain section of the mall. Alternatively, the server 110 can transmit information to a user's device 104*a* that guides the user away or towards crowded areas or shops, depending on the user's preferences. In various embodiments, a message, recommended route, map, alert or other information based on the data received from the server 110 is displayed at the device 104*a* so that the user can take action based on the data.

In still other embodiments, the server 110 provides an emergency-related service. As described above, the techniques described in this application can be used to determine crowded and less crowded areas of a building. In some embodiments, the server 110 transmits information to devices 104*a* used by emergency workers or firefighters indicating the amount of crowding or estimated traffic in different parts of the building. Such information is displayed on the devices 104*a* and can then be used to determine a suitable evacuation plan and to locate people in the building in the event of a fire, earthquake or other emergency.

Figure 11:
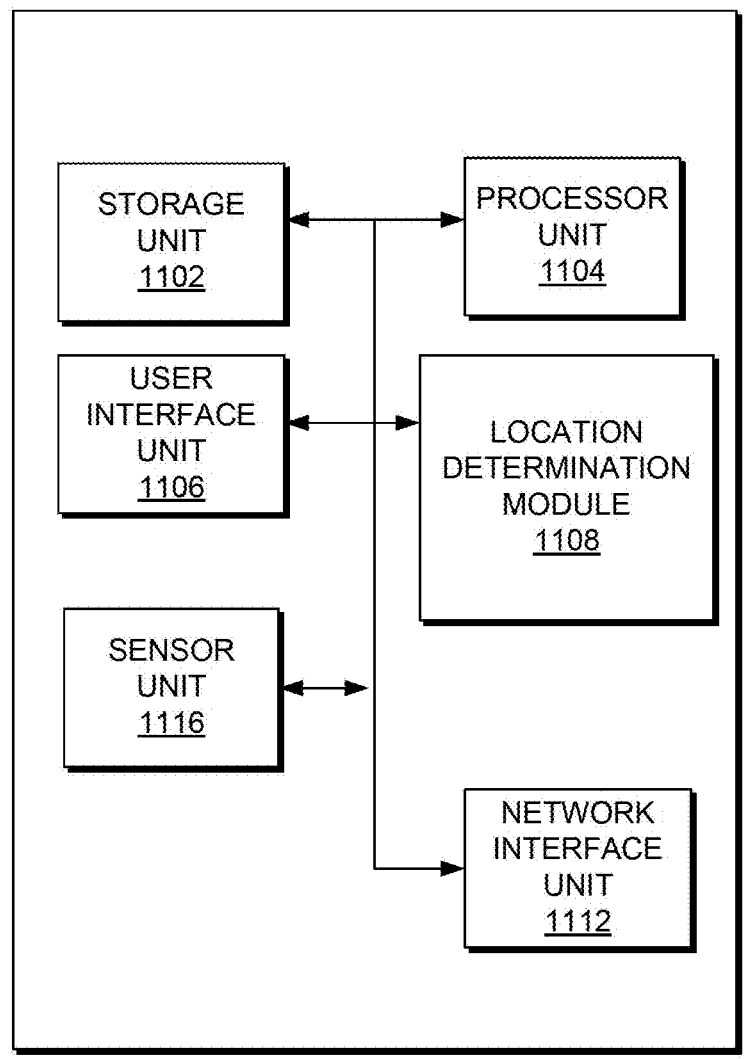
FIG. 11 is a block diagram illustrating a device according to a particular embodiment of the present invention.

Referring next to FIG. 11, a device 104*a* according to a particular embodiment of the present invention will be described. By way of example, the device 104*a* may be any of the devices 104*a*-104*d* of FIG. 1. The device 104*a* includes a processor unit 1104 that includes one or more processors, a storage unit 1102, a sensor unit 1116, a user interface unit 1106, a location determination module 1108, and a network interface unit 1112. The device 104*a* may be any suitable computing device, including but not limited to a smartphone, computer tablet, computer glasses, smartwatch and/or any other type of wearable technology.

The network interface unit 1112 includes any hardware or software suitable for enabling the device 104*a* to communicate with radio frequency (RF) transmitters, WiFi access points, a GPS satellite, the server 110 and any other suitable external devices or networks. For example, the network interface unit 1112 is arranged to receive GPS and RF signals. These signals can be later used to help determine the entrance to a building or other area (e.g., as discussed in connection with method 200 of FIG. 2.) The network interface also is used to transmit sequential trajectory data, GPS data, RF data, ambient signal data, sensor data and other types of data to the server 110 for further processing. The network interface unit is arranged to transmit and receive data using any suitable network (e.g., LAN, Internet, etc.) or communications protocol (e.g., Bluetooth, WiFi, etc.)

The storage unit 1102 is any hardware or software suitable for storing data or executable computer code. The storage unit 1102 can include but is not limited to a hard drive, flash drive, non-volatile memory, volatile memory or any other type of computer readable storage medium. Any operation or method for the device 104*a* that is described in this application (e.g., method 200, 300 and 400 of FIGS. 2-4) may be stored in the form of executable computer code or instructions in the storage unit 1102. The execution of the computer code or instructions by the processor unit 1104 causes the device 104*a* to perform any of the aforementioned operations or methods.

The sensor unit 1116 includes any hardware or software suitable for sensing changes in temperature, light, sound, magnetic fields, direction, motion, speed or any other suitable environmental parameter. In various embodiments, the sensor unit 1116 includes an accelerometer, a magnetometer, a compass, a temperature sensor, a light sensor, a motion sensor, an audio sensor or any other suitable type of sensor. Various implementations involves using the sensor unit 1116 to collect sensor data, which is used to determine the location of an entrance (e.g., as described in steps 208, 210 and 212 of FIG. 2) or for cluster filtering (e.g., as described in steps 306 and 308 of FIG. 3).

The location determination module 1108 is any software or hardware arranged to help determine the location of a particular site, entrance, room, landmark or other area. In various embodiments, for example, the location determination module 1108 is a software module that is arranged to perform some or all of the steps and methods described in connection with FIGS. 2-3. That is, the location determination module can help collect GPS, ambient, sensor and radio frequency data; determine a location of an entrance to a building based on such data; transmit the data and location to the server; obtain sequential trajectory data (e.g., GPS or PDR data); cluster and filter the data; provide an estimate of a candidate indoor room/area location; and transmit the candidate indoor room/area to a server for further analysis and processing.

The user interface unit 1106 is any hardware or software for presenting an interactive user interface to the user of the device 106a. In various embodiments, the user interface unit includes but is not limited to a touch-sensitive (capacitive) screen, a video display, an e-ink display, an LCD screen, an OLED screen and a heads up display. The user interface 1106 may also be capable of receiving audio commands and making audio statements. Some implementations involve displaying maps, directions and/or the locations of building entrances, areas on interest and rooms in the user interface. These locations may have been determined at the device (e.g., steps 212 and 310 of FIGS. 2 and 3) or at a server (e.g., step 410 of FIG. 4).

Figure 12:
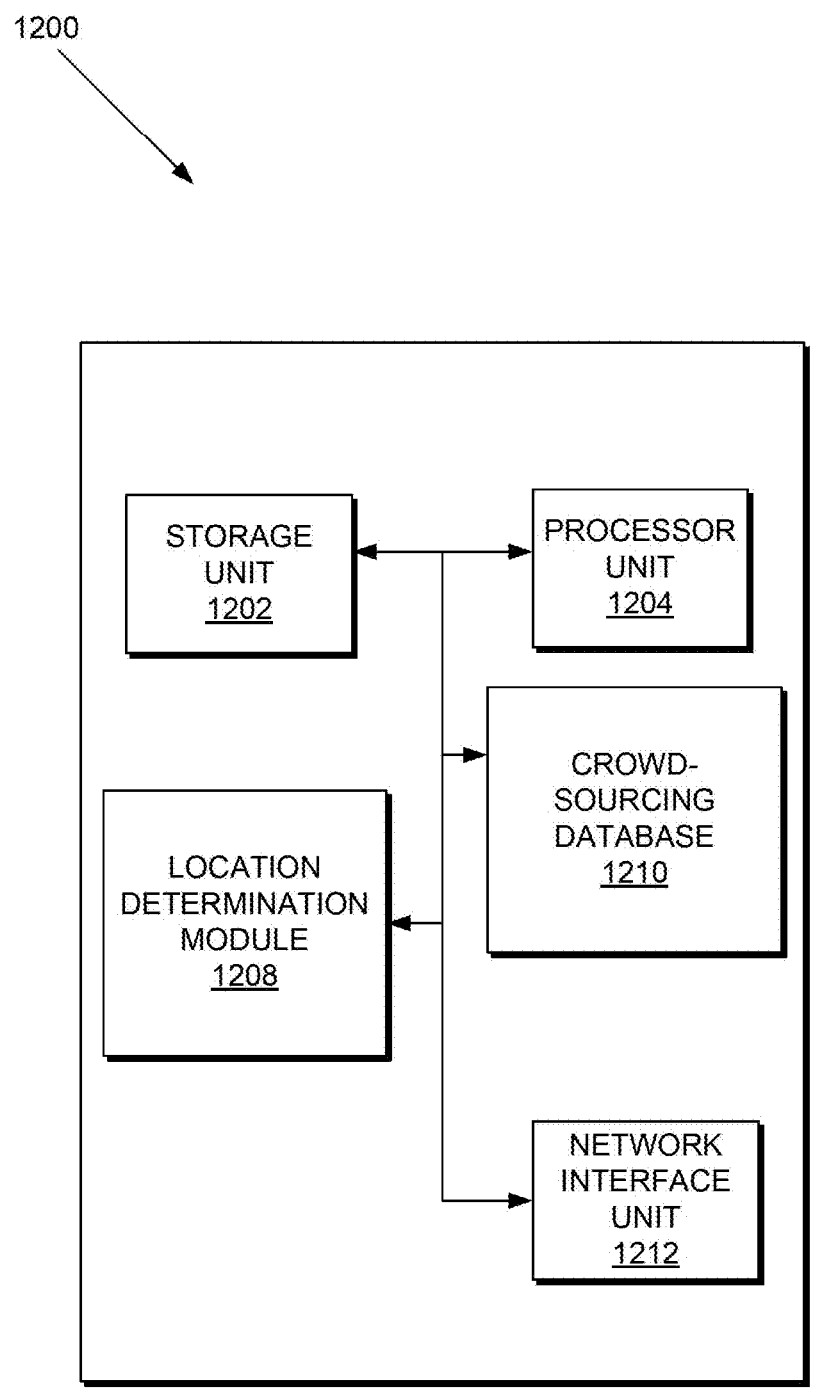
FIG. 12 is a block diagram illustrating a server according to a particular embodiment of the present invention.

Referring next to FIG. 12, a server 110 according to a particular embodiment of the present invention will be described. The server 110 includes a processor unit 1204 that includes one or more processors, a storage unit 1202, a location determination module 1208, a crowdsourcing database 1210 and a network interface unit 1212. The server 110 may be, for example, the server 110 illustrated in FIG. 1.

The network interface unit 1212 includes any hardware or software suitable for enabling the server 110 to communicate with the devices 104a-104d. For example, the network interface unit 1212 is arranged to receive GPS data, radio frequency data, sensor data, ambient signal data and sequential trajectory data from the devices 104a-104d. This crowdsourced data is then passed on to other components (e.g., the location determination module 1208) in the server 110 for further analysis and processing. The network interface unit is also used to transmit data (e.g., the location of a building entrance as determined in step 214 of FIG. 2, the location of an indoor room, entrance, exit or partitions as determined in steps 408, 410 and 412 of FIG. 4, etc.) to the devices 104a-104d. The network interface unit is arranged to transmit and receive data using any suitable network (e.g., LAN, Internet, etc.) or communications protocol (e.g., Bluetooth, WiFi, etc.)

The storage unit 1202 is any hardware or suitable for storing data or executable computer code. The storage unit 1202 can include but is not limited to a hard drive, flash drive, non-volatile memory, volatile memory or any other type of computer readable storage medium. Any operation or method for the server 110 that is described in this application (e.g., methods 200, 300 and 400 of FIGS. 2-4) may be stored in the form of executable computer code or instructions in the storage unit 1202. The execution of the computer code or instructions by the processor unit 1204 (which includes one or more processors) causes the server 110 to perform any of the aforementioned operations or methods.

The crowdsourcing database 1210 is any hardware or software used to store data received from multiple devices 104a-104d. As previously discussed, in various embodiments, the devices 104a-104d transmit various types of data (e.g., ambient signal data, sensor data, GPS data, radio frequency data, WiFi data, candidate indoor rooms or areas of interest, location data, sequential trajectory data, etc.) to the server 110. Such crowdsourced data is stored in the database 1210 for analysis by the location determination module 1208.

The location determination module 1208 is any software or hardware arranged to help determine the location of an area of interest, such as a building entrance or an indoor room. In various embodiments, the location determination module 1208 is a software module that is arranged to perform any, some or all of the operations previously described in connection with methods 200, 300 and 400 of FIGS. 2, 3 and 4. In some implementations, for example, the location determination module 1208 clusters, filters and analyzes the data stored at the crowdsourcing database 1210. Based on these operations, the location determination module 1208 uses the data to more precisely estimate the location of an entrance to a building, the location of an indoor room or other area of interest.

Figure 13:
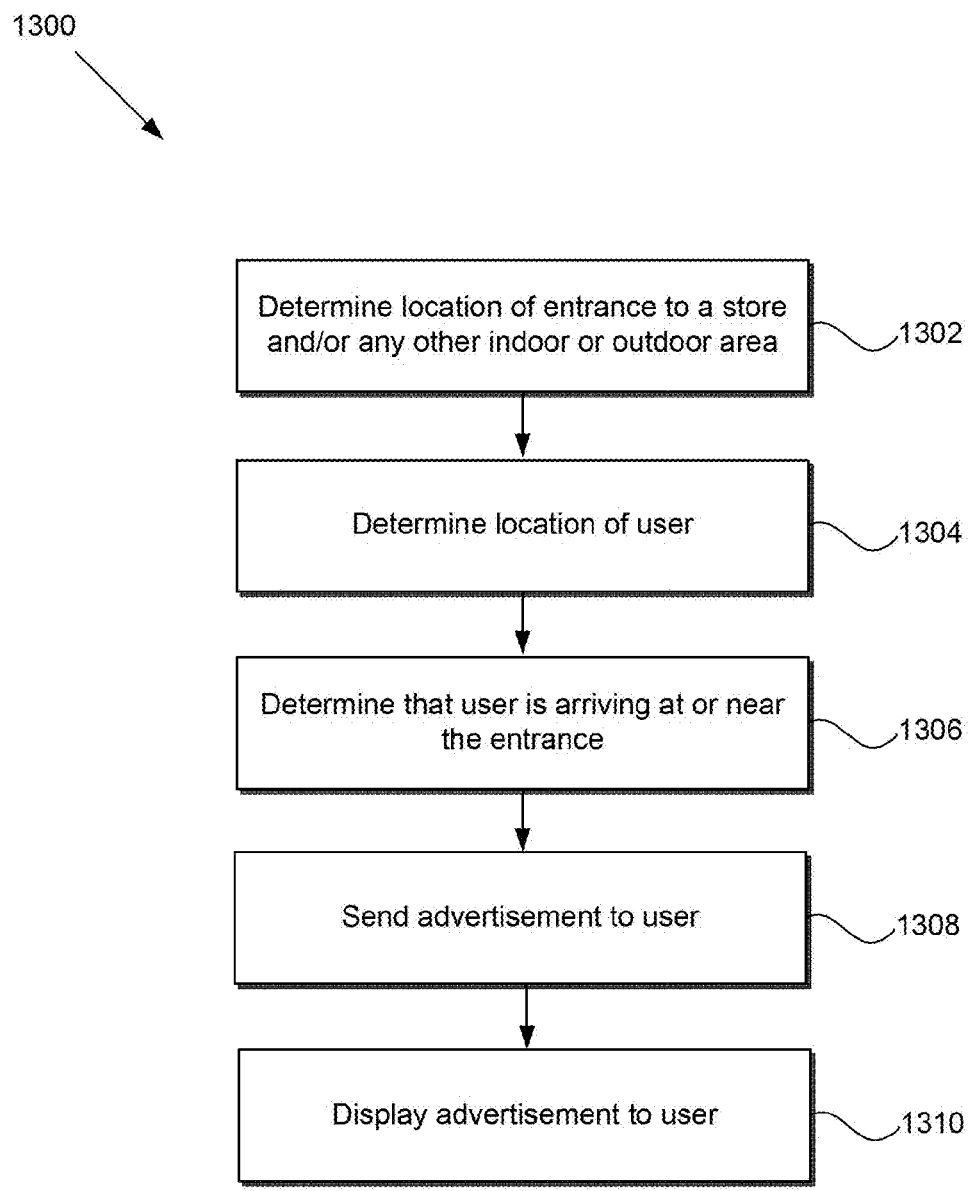
FIG. 13 is a flow diagram illustrating a method for providing location-based advertisements to a user according to a particular embodiment of the present invention.

Referring next to FIG. 13, an example method 1300 for providing advertisements and other services to a user who has just arrived at an entrance to a store, shopping area, mall or other area will be described.

Initially, at step 1302, the location of an entrance to an area is determined. The area may be a store, a mall, a room or any indoor or outdoor area. Various techniques for determining the location of entrances and areas have been described in this application. Any of these techniques (e.g., step 212 of FIG. 2, step 310 of FIG. 3, steps 408 and 410 of FIG. 4, methods 200, 300 and 400 of FIGS. 2-4, etc.) may be used in step 1302.

At step 1304, the location of the user is determined Various techniques for determining the location of a user have been described in this application. By way of example, the location and movement of a user may be determined using GPS, RF data, sequential trajectory data and/or PDR data that is collected by a (mobile) device 104a e.g., as described in connection with steps 202, 204 and 208 of FIG. 2 and step 302 of FIG. 3. In various implementations, this data is transmitted from the device 104a to a server 110 in real time, so that the server 110 can track the movements of the mobile device user.

At step 1306, the server 104 analyzes the received data and determines that a particular user is arriving at, is located at and/or is near the entrance whose location was determined in step 1302.

In response to step 1306, the server 110 transmits advertisement data to a device 104a that is held by the user (step 1308). The device 104a then displays a notification or advertisement to the user based on that data (step 1310).

The above method can be implemented in a wide variety of ways. For example, consider a scenario in which a user arrives at the entrance to a store. Once the server determines that this has occurred (e.g., steps 1302, 1304 and 1306), the user receives an advertisement indicating special deals or discounts at the store (e.g., steps 1308 and 1310).

In another embodiment, a user is in a car that is moving past an entrance to a store. The server 110 determines that the user is moving above a predetermined speed (which indicates that the user is in the car) and that the user is sufficiently near the entrance (e.g., steps 1302, 1304 and 1306.) Based on this determination, the server 110 transmits an advertisement or notification to the user (e.g., step 1308). In some embodiments, the advertisement displays a message or images to the user, which encourages him or her to visit the store and/or provides special deals for products in the store (e.g., steps 1310).

In still other embodiments, the server 110 uses the above techniques to distinguish between visitors who are just arriving at the entrance of the store and are expected to start shopping and visitors who are leaving the store or are just passing by. By way of example, in various implementations, the server 110 determines that the user has approached the entrance to a store, passed through the entrance and has just entered into the store (step 1306.) Only when these conditions are met, is an advertisement transmitted to the user (step 1308.) Users that have been in the store for a period of time and are exiting out of the store do not receive an advertisement. Users who are simply passing by the entrance and who do not actually go into the store also do not receive an advertisement.

Thus, method 1300 can be used to more precisely target users who have just entered a store and are more likely to consider purchasing something. This is in contrast to various beacon-based advertising technologies, which involve setting up a beacon or transmitter with a fixed transmission range at the entrance to a store. In such approaches, an advertisement or notification is sent to any suitably configured mobile device that passes within the range of the beacon. However, a weakness of such an approach is that advertisements can end up being sent to users who have no intention of entering the store. For example, since advertisements are sent to anyone in range of the beacon, users who are simply passing by the store or are exiting the store may also receive advertisements, which can be inconvenient and bothersome to those users.

Figure 14:
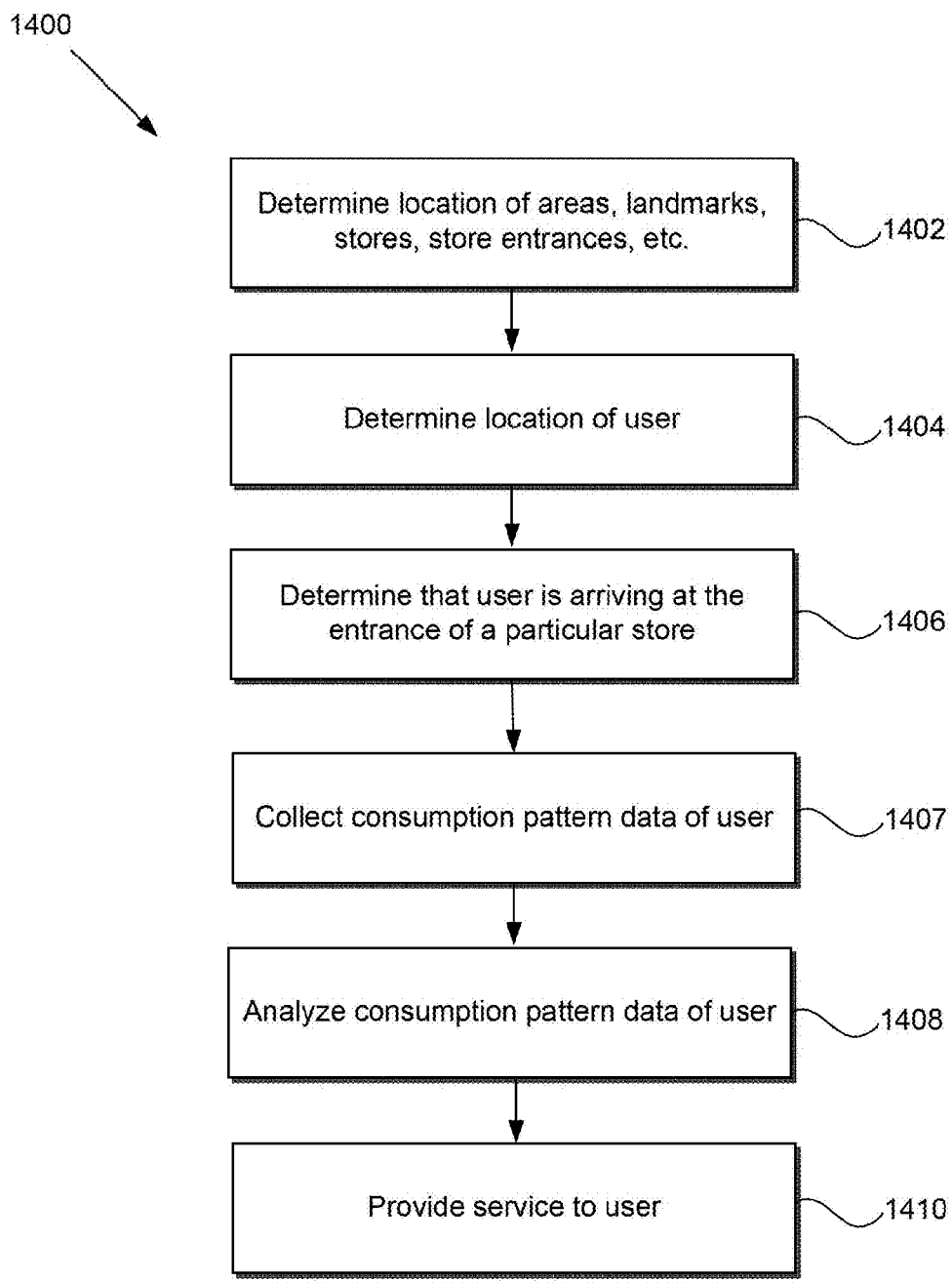
FIG. 14 is a flow diagram illustrating a method for using consumption pattern data to provide a service to a user according to a particular embodiment of the present invention.

Referring next to FIG. 14, an example method 1400 for using consumption patterns in order to provide a service to a customer will be described. Initially, at step 1402, the location of one or more areas (both indoor or outdoor), landmarks, stores, store entrances, etc. is determined. This application discusses a variety of location determination processes that may be used in step 1402. By way of example, the location of areas, landmarks, stores or rooms can be determined using the techniques described in connection with step 310 of FIG. 3 and steps 408 and 410 of FIG. 4, and/or more generally using methods 200, 300 and 400 of FIGS. 2-4.

At step 1404, the location of the user is determined. This may be determined in any suitable manner. By way of example, the location and movement of a user may be determined using GPS, RF and/or PDR data that is collected by a mobile device e.g., as described in connection with steps 202, 204 and 208 of FIG. 2 and step 302 of FIG. 3. In various implementations, this data is transmitted from a user device 104a to a server 110 in real time, so that the server 110 can track the movements of the mobile device user.

At step 1406, the server 110 determines that the user is arriving at an entrance of a particular store (e.g., a location of a store or other building/area determined in step 1402.) In various embodiments, the store can instead be any suitable structure, building or area.

At step 1407, the server 110 collects consumption pattern data of the user. Consumption pattern data is any data that indicates or relates to activities, interests, consumption patterns and/or commercial transactions of a user. The collection of consumption pattern data can take place at any time e.g., at regular intervals and/or before steps 1402, 1404 or 1406. In some embodiments, step 1407 takes place after and in response to the determination made in step 1406. The collection of consumption pattern data may be performed in any suitable manner. In some embodiments, for example, the server 110 accesses or receives data stored on the device 104a held by the user. The data can indicate information about the user e.g., purchases, commercial transactions, preferences, user profile data, etc. In various implementations, the server 110 receives sequential trajectory data collected by the device 104a and thus is able to determine how much time the user has spent in various stores, buildings, or locations (e.g., as discussed in connection with step 302 and method 300 of FIG. 3.) All of the above information is consumption pattern data which can be used to infer the consumption preferences of the user.

At step 1408, the consumption pattern data is analyzed. In some embodiments, this step is performed in response to step 1406 (e.g., after it is determined that the user has entered a particular store.)

Based on the analysis in step 1408, the server 110 provides a service of some kind to the user who has entered the store (step 1410). In some embodiments, for example, the server 110 generates and transmits an advertisement or notification, which is received at the device 104a held by the user. The device 104a then displays the advertisement to the user.

In various embodiments, the advertisement is tailored to the consumption preferences and recent actions of the user. Consider an example in which the server 110 detects that a user has arrived at a clothing store and has spent a long time there (step 1404). The server 110 may access shopping and search data stored on the device 104a indicating that the user is interested in purchasing a scarf as a gift (step 1406). The fact that the user has spent over an hour in the store may suggest that the user is on the fence but is highly disposed towards a purchase (steps 1404 and 1408). Based on this information, the system then sends an advertisement to the user, which provides an explanation of various scarf selections and a personalized discount on particular brands (step 1410).

Any of the methods or operations described herein can be stored in a tangible computer readable medium in the form of executable software code. The code can then be executed by one or more processors. The execution of the code causes a corresponding device (e.g., device 104a-104d or server 110) to perform the described operations.

Although only a few embodiments of the invention have been described in detail, it should be appreciated that the invention may be implemented in many other forms without departing from the spirit or scope of the invention. For example, the present application and figures describe various methods (e.g., methods 200, 300 and 400 of FIGS. 2, 3 and 4) having particular operations. It should be appreciated that in some embodiments, one or more of these operations/steps may be modified, reordered and/or deleted and that the methods are intended to be exemplary and are not intended to limit the scope of the invention. For example, various methods (e.g., methods 1300 and 1400 of FIGS. 13 and 14) indicate that a server 110 performs particular operations. However, this need not be the case. It is possible that one server performs one operation of the method, and that a separate, different server perform another operation. It is also possible that a device other than a server (e.g., device 104a) performs each operation and/or that a particular operation is broken down into multiple substeps, each of which is performed by a different device. Additionally, some figures, such as FIGS. 11 and 12, describe devices that contain various components. It should be noted in some embodiments, one or more of these components may be merged together. In still other embodiments, one or more components may be separated into a greater number of components. The features of one component may be transferred to another and/or modified as appropriate. Each device may have additional components beyond what is shown in the corresponding figure. For example, the device 104a of FIG. 11 may also include any component, technology, sensor, user interface or feature that is included in any known smartphone or mobile device. Therefore, the present embodiments should be considered illustrative and not restrictive and the invention is not to be limited to the details given herein.

What is claimed is:

1. A method for determining a location of a first area, the method comprising:
   obtaining sequential trajectory data that forms one or more clusters, wherein the sequential trajectory data is collected by one or more sensors of a computing system;
   filtering the one or more clusters based on motion or speed associated with the sequential trajectory data; and
   determining, by a communication system comprising the computing system, a location of a first area based at least in part on the remaining, unfiltered one or more clusters.

2. The method of claim 1 wherein:
   the sequential trajectory data is obtained using at least one of pedestrian dead reckoning (PDR) and GPS by the computing system; and
   the first area is at least one of an indoor room, a landmark, a store and an outdoor area.

3. The method of claim 1 wherein:
   the sequential trajectory data indicates a movement of the computing system over time; and
   the sequential trajectory data forms a trace made of a plurality of points, each point being associated with a time and a position of the computing system.

4. The method of claim 1 further comprising:
   forming the plurality of clusters from the sequential trajectory data based on distance and duration.

5. The method of claim 4 wherein:
   the sequential trajectory data indicates a plurality of points, each point representing a particular location of the computing system at a particular time; and
   the method further comprising:
      forming the plurality of clusters from some but not all of the points, wherein each cluster indicates that movement of the computing system did not extend beyond a specified radius during a specified period of time; and
      not clustering a portion of the sequential trajectory data, wherein the unclustered portion indicates that in that portion movement of the computing system did extend beyond the specified radius during the specified period of time.

6. The method of claim 1, wherein the computing system comprises a sensor unit, the method further comprising:
   obtaining accelerometer data from the sensor unit that indicates an amount of motion associated with one of the clusters;
   determining whether the amount of motion exceeds a specified threshold; and
   when it is determined that the amount of motion exceeds the threshold, filtering out the one of the clusters.

7. The method of claim 1 further comprising:
   analyzing timestamps and positions associated with points of a trace in one of the clusters to determine a speed associated with the one of the clusters;
   determining whether the speed exceeds a specified threshold; and
   when it is determined that the speed exceeds the threshold, filtering out the one of the clusters.

8. The method of claim 1 wherein:
   the sequential trajectory data is obtained at a server of the communication system from a plurality of devices of the communication system, the sequential trajectory data forming a plurality of crowdsourced traces and a plurality of clusters; and
   the filtering and determining operations are performed by the server.

9. The method of claim 1 wherein there is a second area and the first area is within the second area, the method further comprising:
   collecting GPS data;
   collecting ambient signal data; and
   determining a location of an entrance to the second area based on a combination of the GPS data and the ambient signal data.

10. The method of claim 9 wherein the first area is an indoor room and the second area is a building that includes the indoor room.

11. The method of claim 9 wherein the ambient signal data indicates at least one of (1) a change in a radiofrequency (RF) signal, (2) a change in ambient light, (3) a change in sound, (4) a temperature change; (5) a magnetic field change; (6) a change detected images; and (7) a change in the number of RF signal transmitting devices that the computing system receives RF signals from.

12. The method of claim 9 wherein the determination of the location of the entrance to the second area is based on a pattern found in the GPS data and in the collected RF data wherein the pattern indicates an increase in RF signal quality and a decrease in GPS signal accuracy.

13. The method of claim 9 further comprising:
   receiving the GPS data and ambient signal data at a server of the communication system from the computing system, wherein the determination step is performed by the server.

14. The method of claim 9 further comprising:
   obtaining a plurality of candidate first area locations from a plurality of devices of the communication system;
   selecting a subset of the candidate first area locations based at least in part on a trajectory distance between each candidate first area location and the determined entrance to the second area; and
   estimating a location of the first area based at least in part on the selected subset of the clusters.

15. The method of claim 14 wherein:
   the determination of the location of the first area is performed by one of the plurality of devices of the communication system;
   the determined location of the first area is one of the candidate first area locations; and
   the method further comprises receiving the determined location of the first area at a server of the communication system from the one of the devices of the communication system.

16. The method of claim 14 further comprising:
   assigning weights to each of the selected subset of candidate first area locations wherein the weights are calculated based on a density of the sequential trajectory data at a region around each candidate first area location wherein the estimation of the location of the first area is based at least in part on the assigned weights.

17. A computer readable storage medium, wherein the computer readable storage medium that includes executable computer code embodied in a tangible form operable to determine a location of an area of interest wherein the computer readable storage medium includes:
   executable computer code executable by at least one processor and operable to obtain sequential trajectory data of a computing system that forms one or more clusters;

executable computer code executable by at least one processor and operable to filter the one or more clusters based on motion or speed associated with the sequential trajectory data of the computing system; and executable computer code executable by at least one processor and operable to determine a location of a first area based at least in part on the remaining, unfiltered one or more clusters.

18. The computer readable medium of claim 17 wherein there is a second area and the first area is within the second area, the computer readable medium further comprising:

executable computer code executable by the at least one processor and operable to collect GPS data;

executable computer code executable by the at least one processor and operable to collect ambient signal data; and executable computer code executable by the at least one processor and operable to determine a location of an entrance to the second area based on a combination of the GPS data and the ambient signal data;

executable computer code executable by the at least one processor and operable to form the one or more clusters from the sequential trajectory data based on distance and duration; and executable computer code executable by the at least one processor and operable to determine a location of the first area based on one of the remaining, unfiltered one or more clusters.

19. A system for determining a location of an entrance to a second area and a location of a first area that is within the second area, the system comprising:

a device comprising:
at least one processor;
at least one memory including a computer readable storage medium that includes device computer code stored in a tangible form wherein the device computer code, when executed by the at least one processor of the device, causes the device to:
collect GPS data;
collect ambient signal data; and
determine the location of the entrance to the second area based on a combination of the GPS data and the ambient signal data;
collect sequential trajectory data that forms a trace extending from the entrance to the second area;
cluster the collected sequential trajectory data based on distance and duration, thereby forming one or more clusters from the collected sequential trajectory data;
filter the one or more clusters based on speed and motion; and
determine a candidate location of a first area based on one of the one or more remaining, unfiltered clusters; and a server comprising:
at least one memory including a computer readable storage medium that includes server computer code stored in a tangible form wherein the server computer code, when executed by the at least one processor of the server, causes the server to:
obtain a plurality of candidate first area locations from a plurality of devices;
receive the candidate location of the first area determined by the device, which is one of the plurality of candidate first area locations;
select a subset of the candidate first area locations based at least in part on a trajectory distance between each candidate first area location and the determined location of the entrance to the second area; and
estimate the location of the first area based at least in part on the selected subset.

20. The system of claim 19 wherein:
the server computer code, when executed by the at least one processor of the server, further causes the server to transmit the estimated location of the first area to the device; and
the device computer code, when executed by the at least one processor of the device, further causes the device to:
receive the estimated location of the first area from the server; and
display an indication of the estimated location of the first area on the device.

* * * * *